United States Patent
Yi et al.

(10) Patent No.: US 11,485,516 B2
(45) Date of Patent: Nov. 1, 2022

(54) PRECISE LANDING METHOD OF UNMANNED AERIAL ROBOT USING MULTI-PATTERN IN UNMANNED AERIAL CONTROL SYSTEM AND APPARATUS THEREFOR

(71) Applicant: LG ELECTRONICS INC., Seoul (KR)

(72) Inventors: Seokhee Yi, Seoul (KR); Nakyeong Kim, Seoul (KR); Kwangho An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 460 days.

(21) Appl. No.: 16/488,834

(22) PCT Filed: Jun. 18, 2019

(86) PCT No.: PCT/KR2019/007345
§ 371 (c)(1),
(2) Date: Aug. 26, 2019

(87) PCT Pub. No.: WO2020/256173
PCT Pub. Date: Dec. 24, 2020

(65) Prior Publication Data
US 2021/0362875 A1    Nov. 25, 2021

(51) Int. Cl.
*B64C 39/02*    (2006.01)
*B64D 45/08*    (2006.01)
(Continued)

(52) U.S. Cl.
CPC ............ *B64D 45/08* (2013.01); *B64C 39/024* (2013.01); *B64D 47/08* (2013.01); *B64F 1/18* (2013.01);
(Continued)

(58) Field of Classification Search
None
See application file for complete search history.

(56) References Cited

U.S. PATENT DOCUMENTS

| | | | | |
|---|---|---|---|---|
| 2014/0032034 A1* | 1/2014 | Raptopoulos | ........ | G05D 1/0088 701/25 |
| 2014/0070052 A1* | 3/2014 | Kang | ........................ | B64F 1/18 244/114 R |

(Continued)

FOREIGN PATENT DOCUMENTS

| JP | 2012-71645 A | 4/2012 |
|---|---|---|
| JP | 2017-501475 A | 1/2017 |

(Continued)

*Primary Examiner* — Sze-Hon Kong
*Assistant Examiner* — Davin Seol
(74) *Attorney, Agent, or Firm* — Birch, Stewart, Kolasch & Birch, LLP

(57) ABSTRACT

Disclosed are a precise landing method using a multi-pattern in an unmanned aerial control system and an apparatus therefor. In an aspect of the present invention, a precise landing method using a multi-pattern of an unmanned aerial robot in an unmanned aerial control system includes receiving an image value from an outside and recognizing a multi-pattern in which control information for precise landing control has been coded based on the image value, obtaining control information when an ID value included in the control information indicates a landing point, moving to the landing point based on the control information, and performing landing at the landing point, and recognizing the multi-pattern again if the landing is not completed. A landing area for the landing of the unmanned aerial robot may include the landing point and the multi-pattern. The multi-pattern may include a first multi-pattern and a second multi-pattern. The first multi-pattern may have a greater size than the second multi-pattern.

16 Claims, 14 Drawing Sheets

(51) Int. Cl.
    *B64D 47/08*     (2006.01)
    *B64F 1/18*     (2006.01)
    *G05D 1/10*     (2006.01)
    *G05D 1/06*     (2006.01)

(52) U.S. Cl.
    CPC ........ *G05D 1/101* (2013.01); *B64C 2201/027* (2013.01); *G05D 1/0676* (2013.01)

(56) References Cited

U.S. PATENT DOCUMENTS

| | | | |
|---|---|---|---|
| 2016/0039542 A1* | 2/2016 | Wang | B64D 39/00 |
| | | | 701/2 |
| 2016/0122038 A1* | 5/2016 | Fleischman | G05D 1/0676 |
| | | | 701/2 |
| 2017/0045894 A1* | 2/2017 | Canoy | G08G 5/0013 |
| 2018/0039286 A1* | 2/2018 | Tirpak | G05D 1/042 |
| 2018/0367284 A1* | 12/2018 | Huang | H04L 1/1671 |
| 2020/0244087 A1* | 7/2020 | Yang | B64D 45/08 |
| 2020/0401163 A1* | 12/2020 | Inoshita | G05D 1/101 |
| 2021/0031945 A1* | 2/2021 | Inoshita | G05D 1/0676 |
| 2021/0405654 A1* | 12/2021 | Ulun | G06T 7/80 |

FOREIGN PATENT DOCUMENTS

| | | |
|---|---|---|
| JP | 2018-536934 A | 12/2018 |
| KR | 10-2017-0127242 A | 11/2017 |
| KR | 10-2017-0128957 A | 11/2017 |
| KR | 101811130 B1 * | 12/2017 |

\* cited by examiner

[FIG 1]
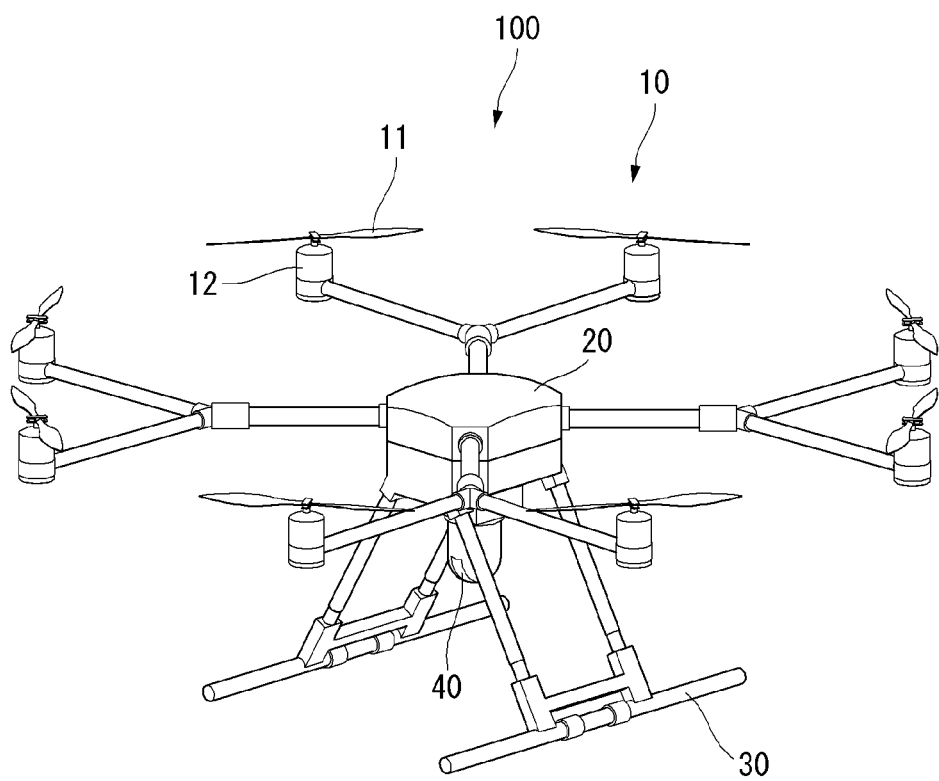

[FIG 2]
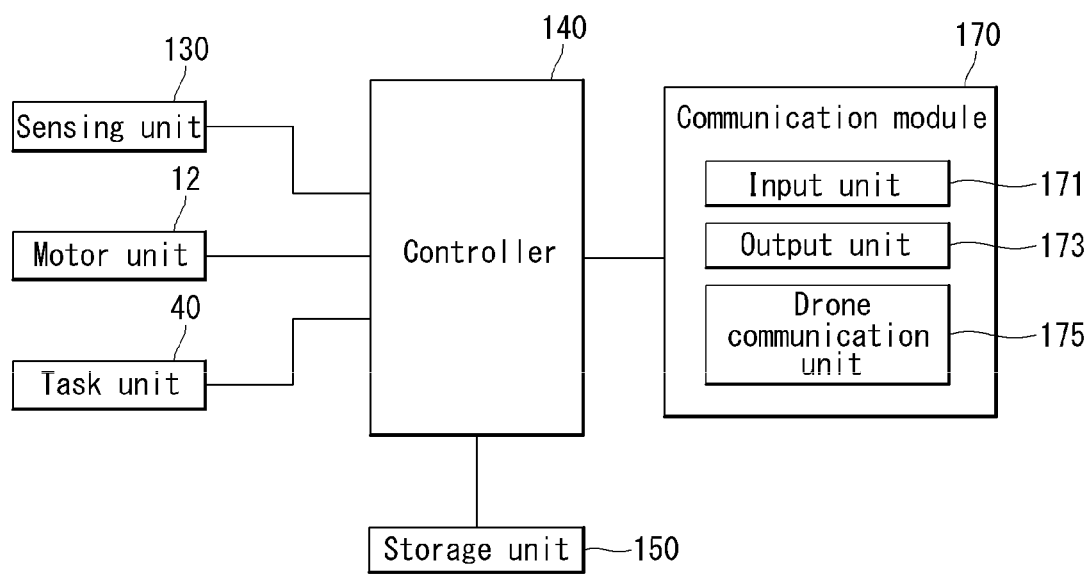

[FIG 3]
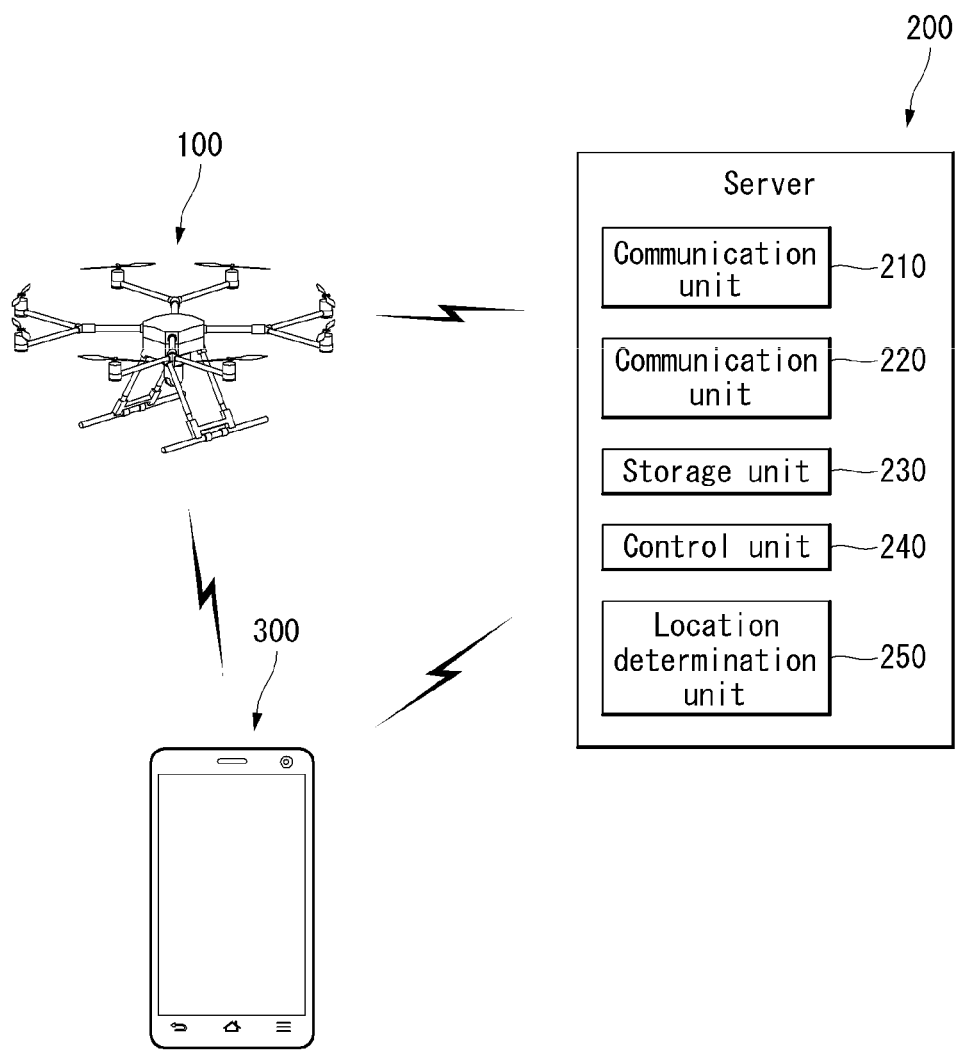

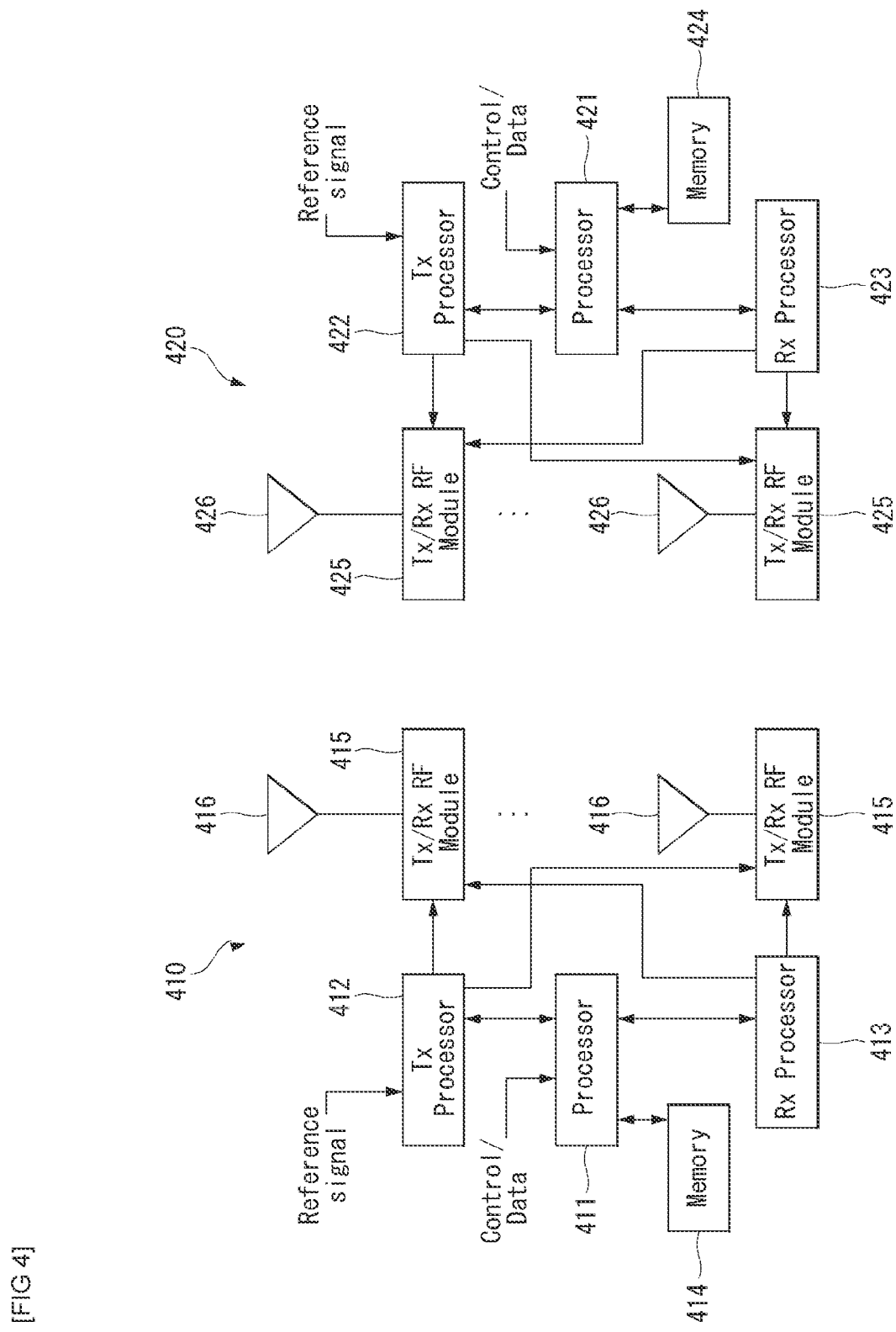
[FIG 4]

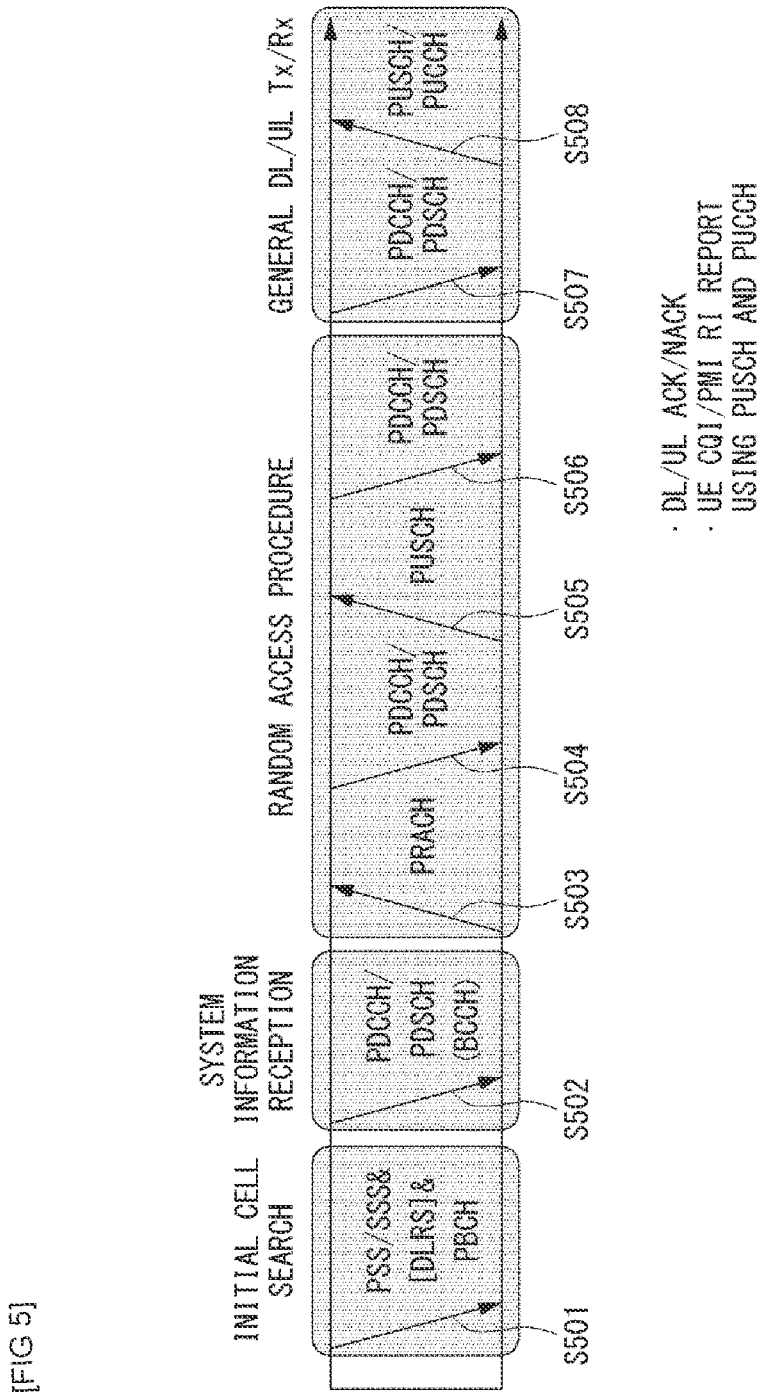

[FIG 6]
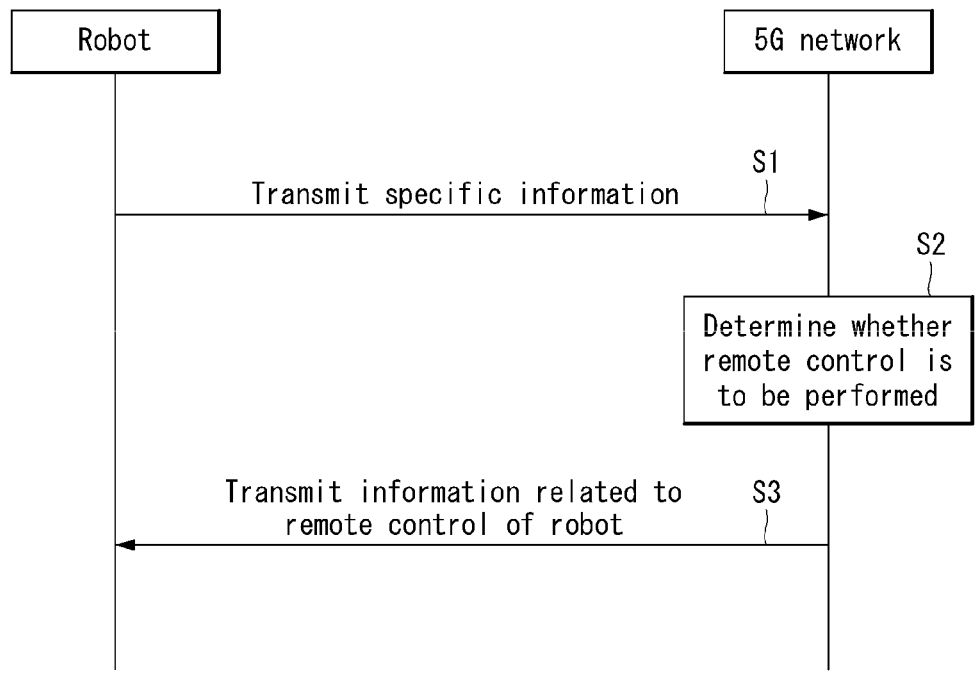
[FIG 7]
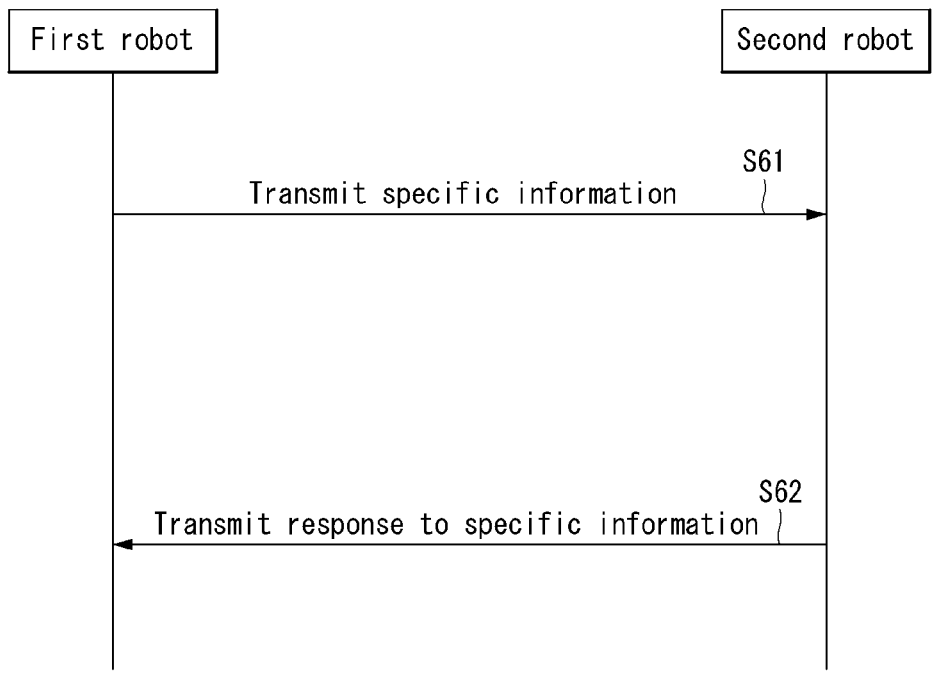

[FIG 8]
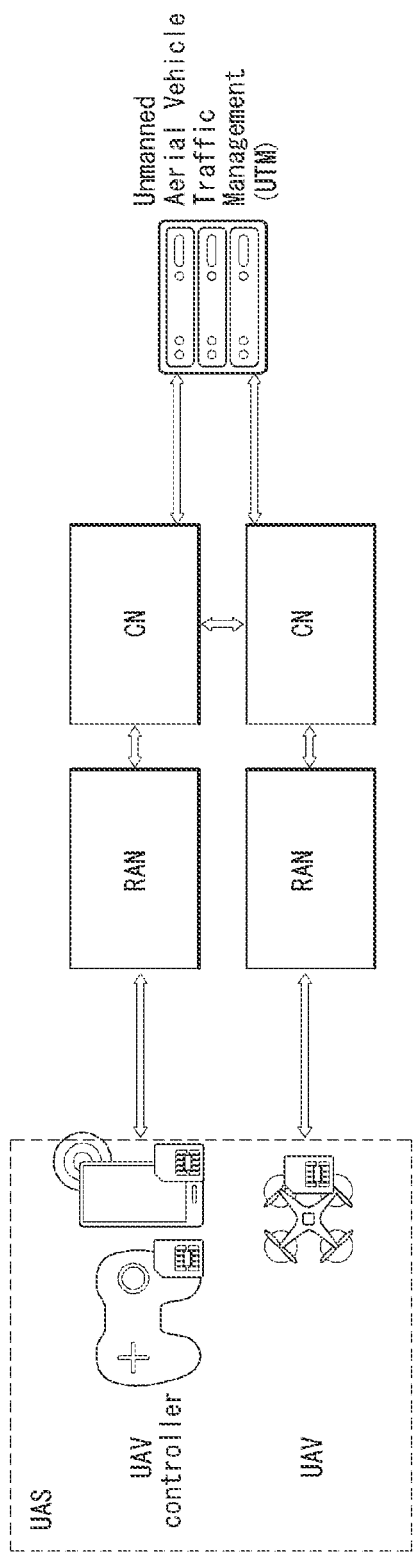

[FIG 9]
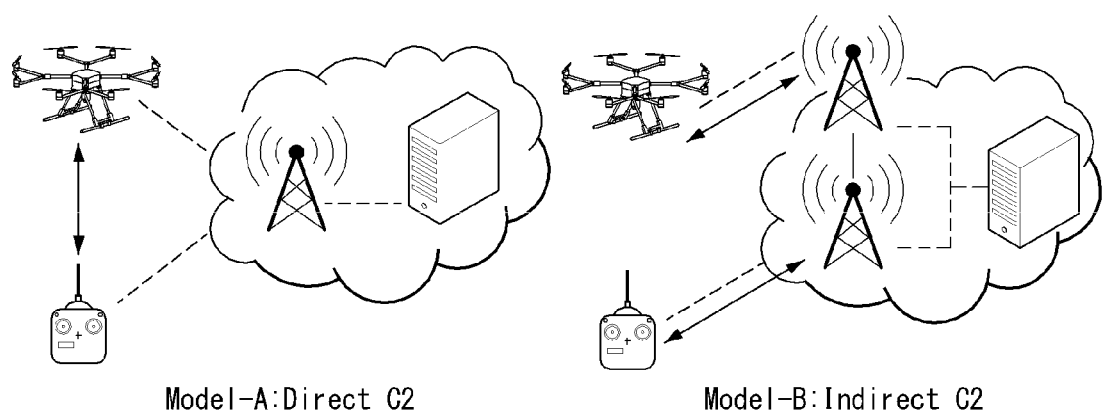
Model-A:Direct C2          Model-B:Indirect C2
[FIG 10]
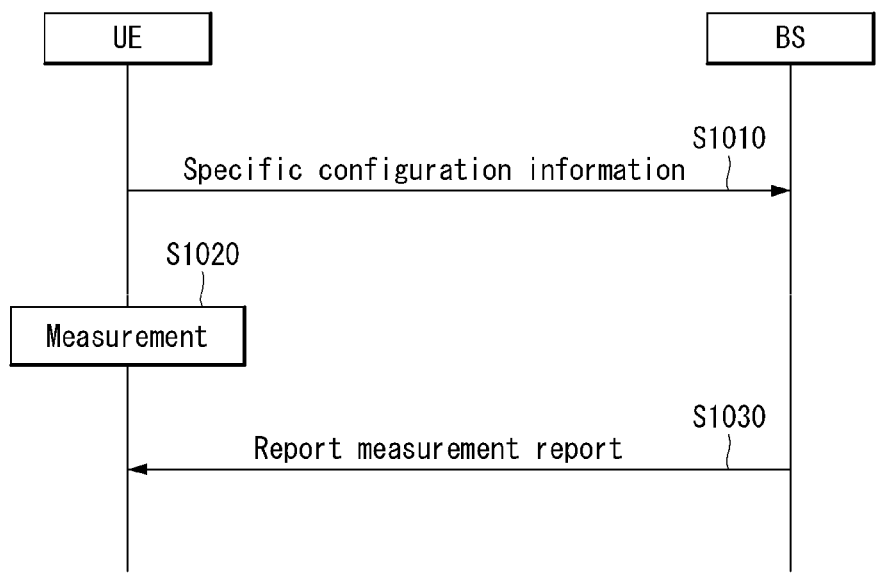

[FIG 11]
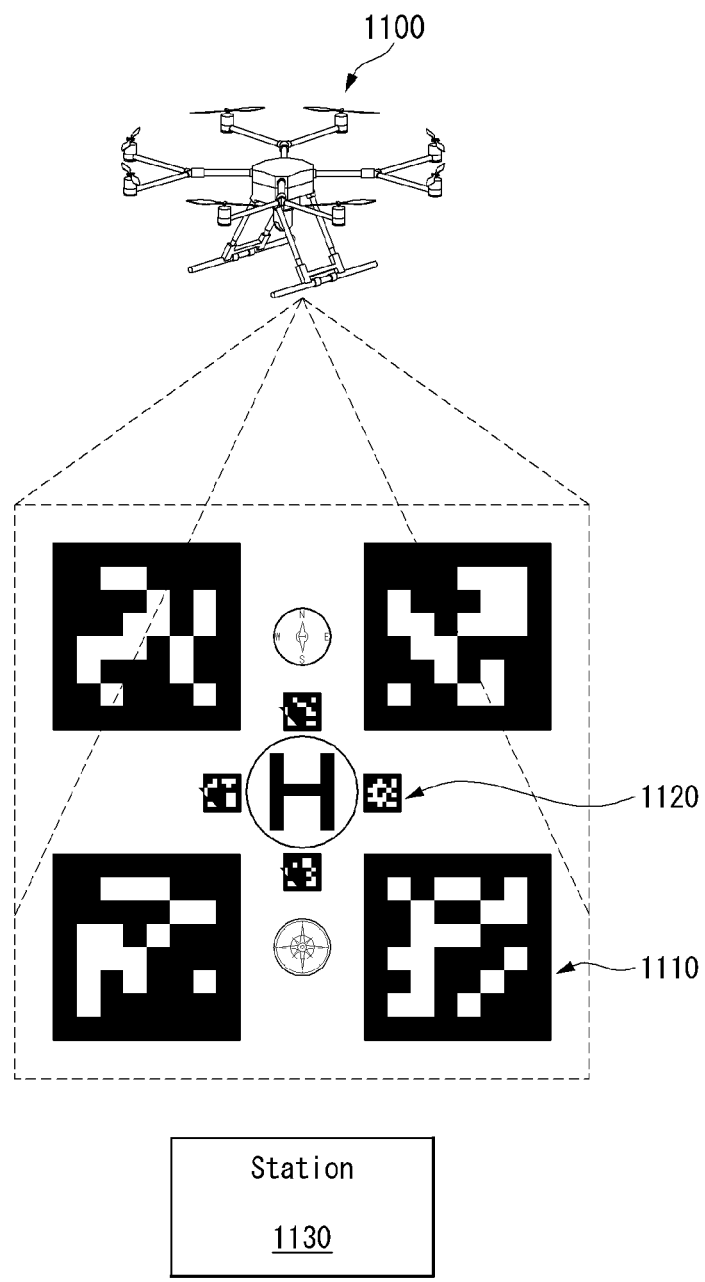

[FIG 12]
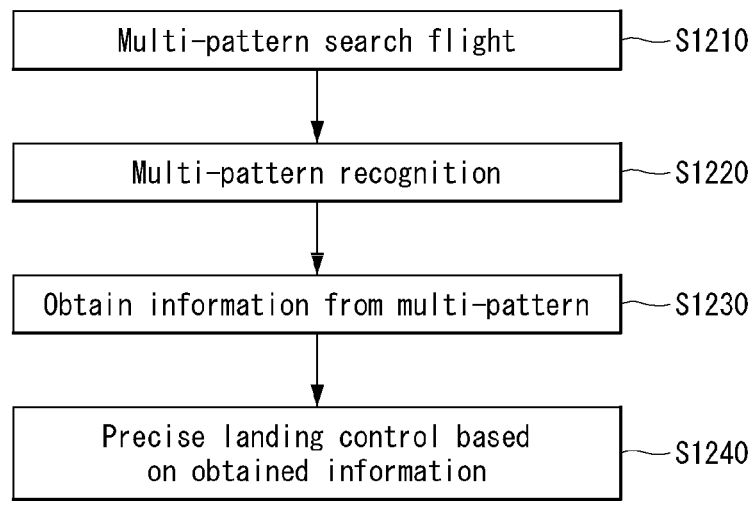

[FIG 13]
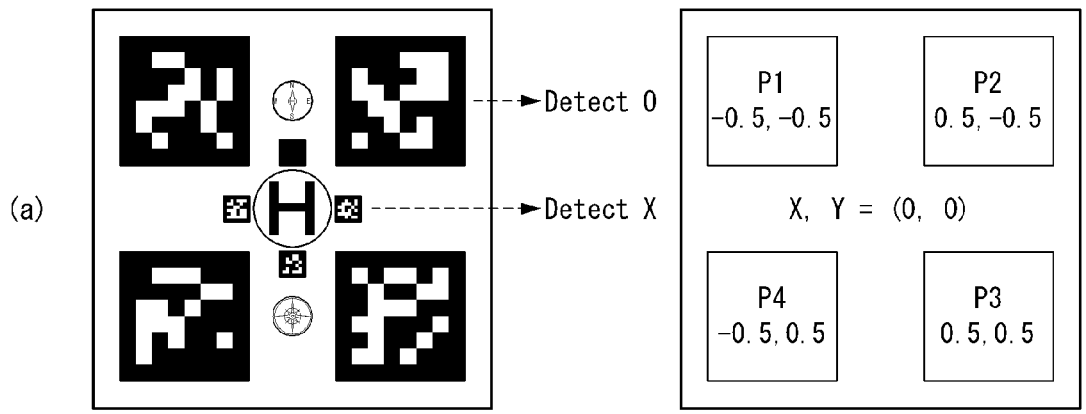
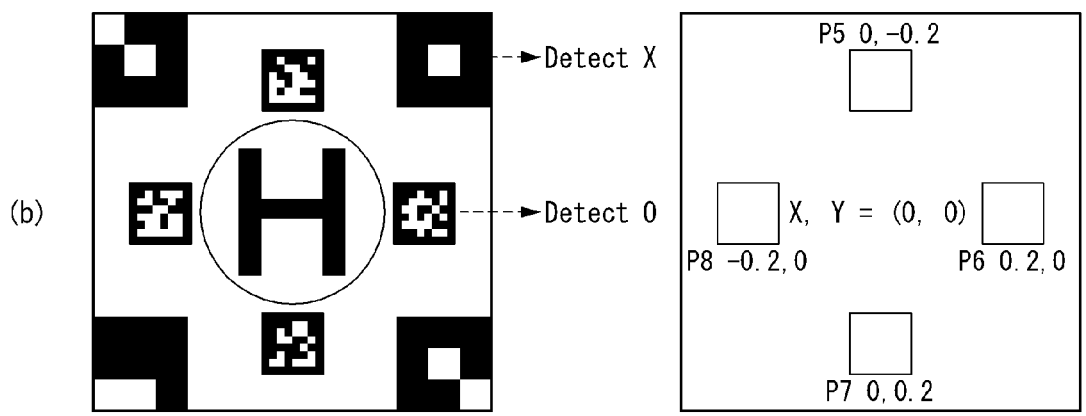
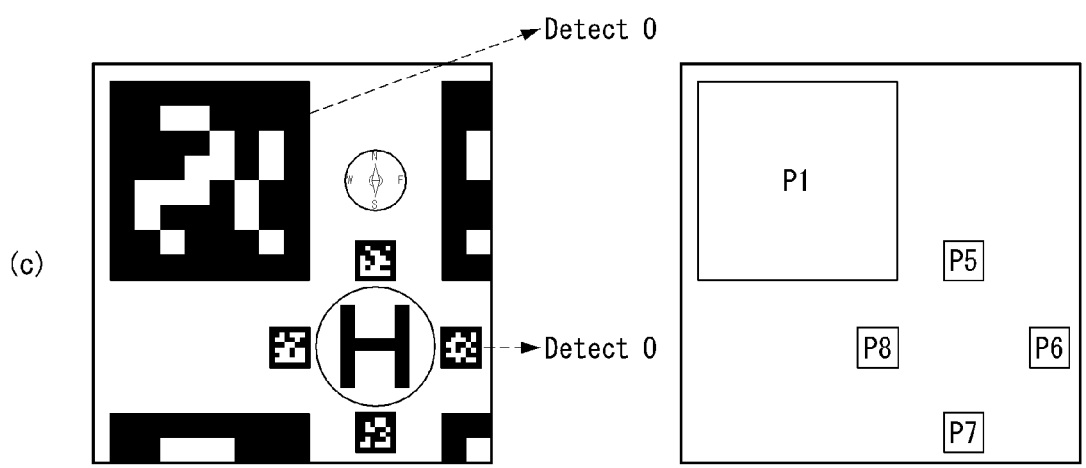

[FIG 14]
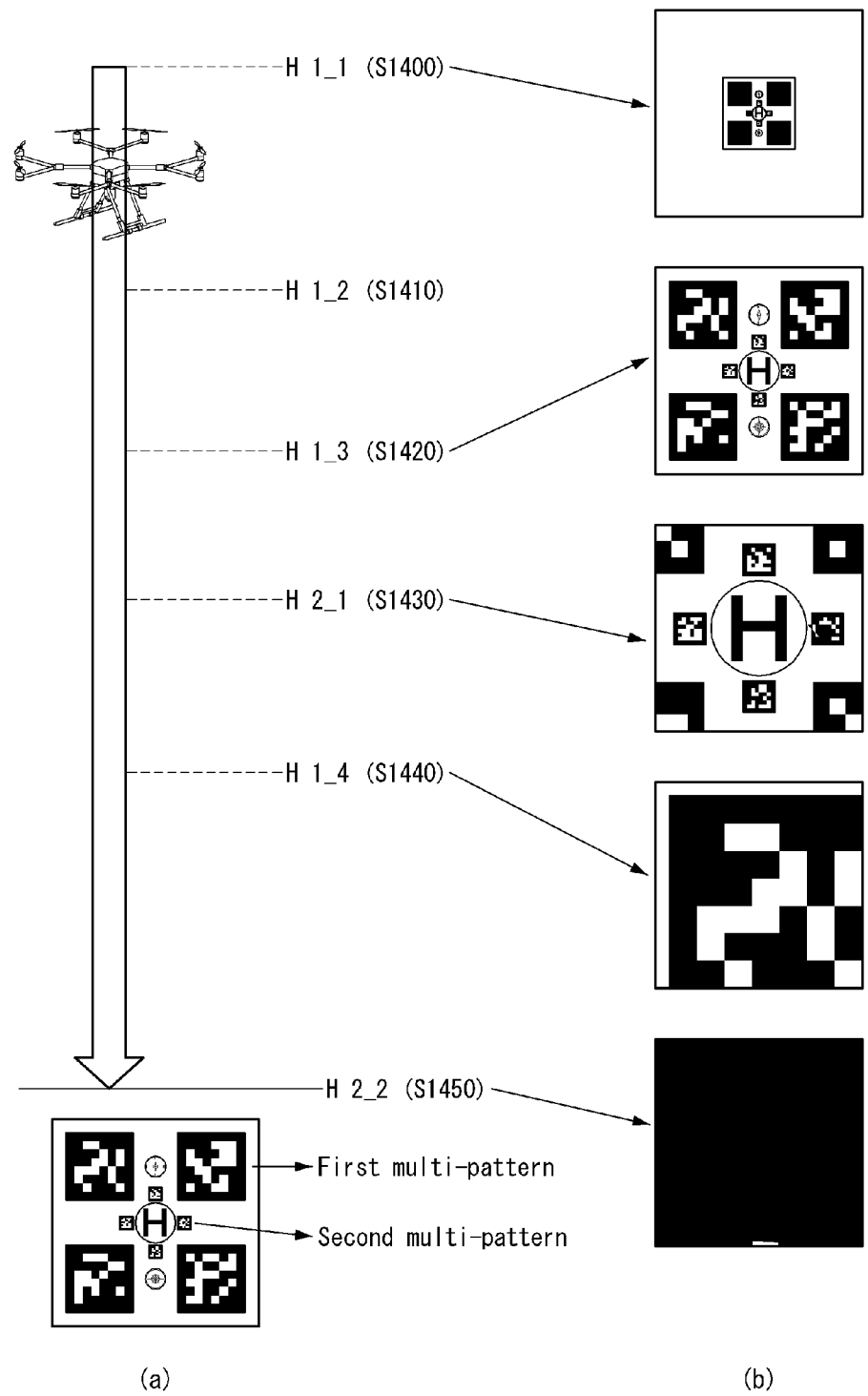

[FIG 15]
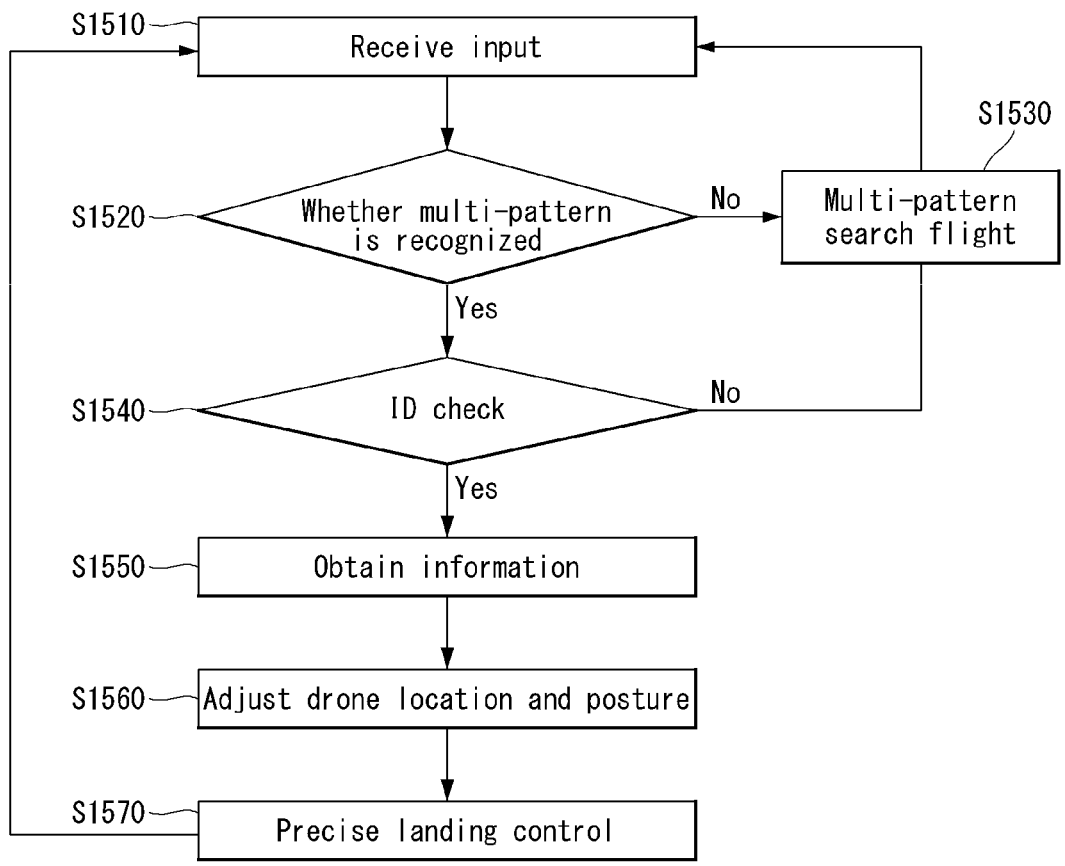
[FIG 16]
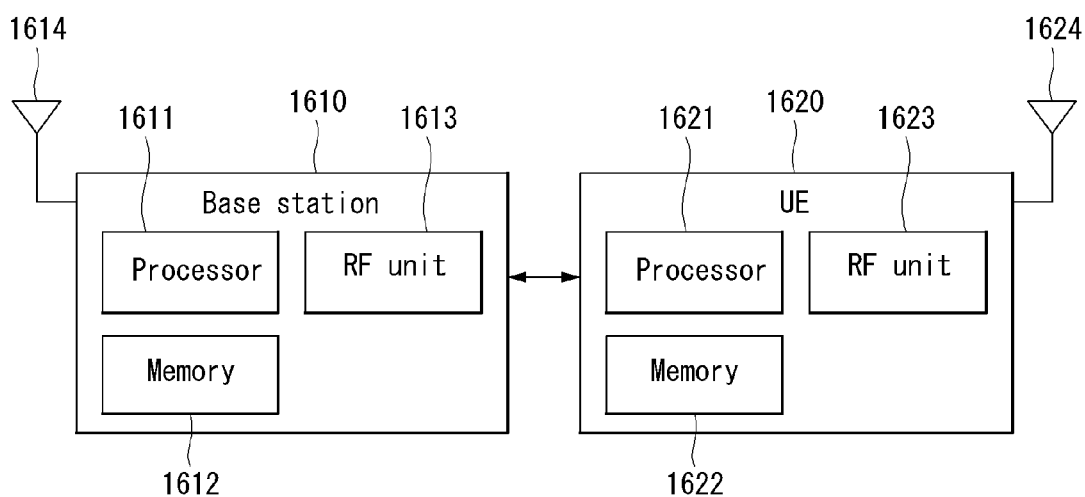

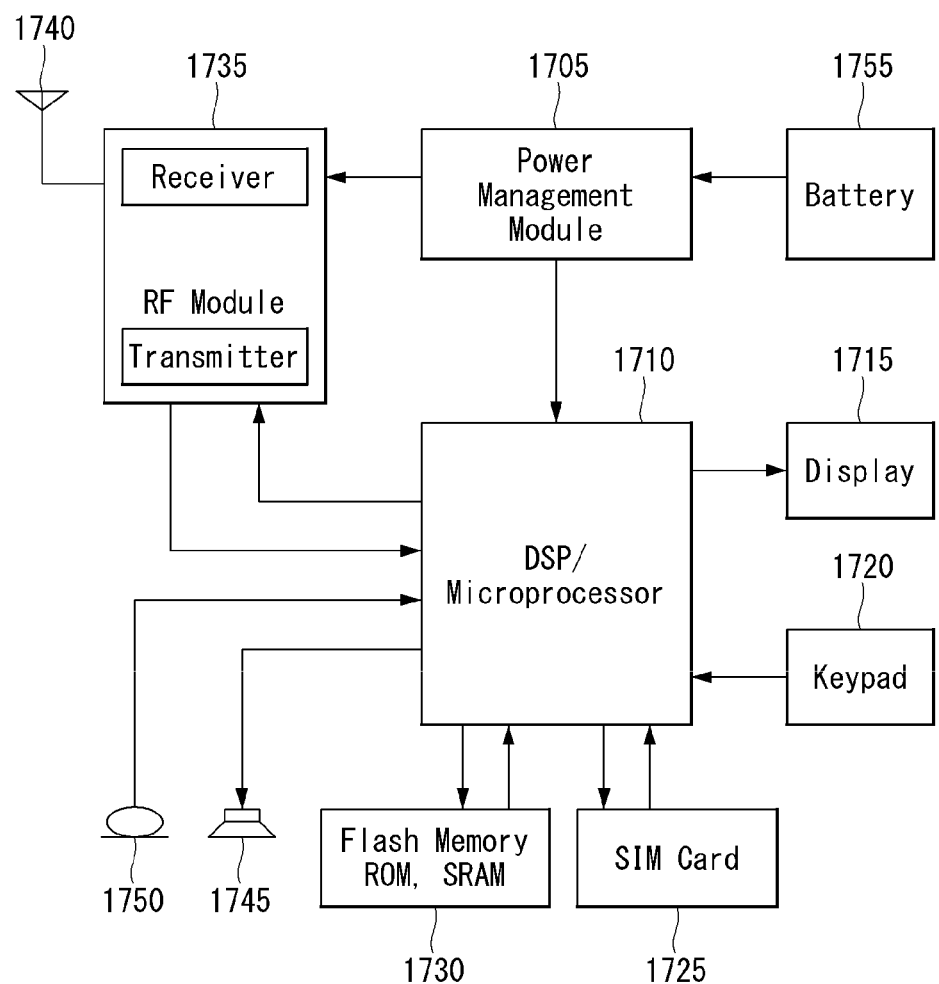
[FIG 17]

PRECISE LANDING METHOD OF UNMANNED AERIAL ROBOT USING MULTI-PATTERN IN UNMANNED AERIAL CONTROL SYSTEM AND APPARATUS THEREFOR

CROSS-REFERENCE TO RELATED APPLICATION

This application is the National Phase of PCT International Application No. PCT/KR2019/007345, filed on Jun. 18, 2019, which is hereby expressly incorporated by reference into the present application.

TECHNICAL FIELD

The present invention relates to an unmanned aerial control system and, more particularly, to a precise landing method using a multi-pattern and an apparatus therefor.

BACKGROUND ART

An unmanned aerial vehicle generally refers to an aircraft and a helicopter-shaped unmanned aerial vehicle/uninhabited aerial vehicle (UAV) capable of a flight and pilot by the induction of a radio wave without a pilot. A recent unmanned aerial vehicle is increasingly used in various civilian and commercial fields, such as image photographing, unmanned delivery service, and disaster observation, in addition to military use such as reconnaissance and an attack.

Such an unmanned aerial vehicle may be driven through remote pilot on the ground, or may autonomously fly in an automatic or semi-auto-piloted form according to a pre-programmed route, or may be driven through an unmanned aerial control system, including an aerial vehicle including artificial intelligence to perform a mission according to a self-environment determination and a ground control station/system (GCS) and communication equipment (data link) support equipments.

DISCLOSURE

Technical Problem

The present invention proposes a precise landing method and apparatus using a multi-pattern through a wireless communication system in an unmanned aerial control system.

Furthermore, the present invention proposes a precise landing method and apparatus using only a camera sensor using multi-patterns having different sizes.

Technical objects of the present invention are not limited to the above-described technical objects, and other technical objects not described above may be evidently understood by those skilled in the art to which the present invention pertains from the following description.

Technical Solution

In an aspect, a precise landing method using a multi-pattern of an unmanned aerial robot in an unmanned aerial control system includes receiving an image value from an outside and recognizing a multi-pattern in which control information for precise landing control has been coded based on the image value, obtaining control information when an ID value included in the control information indicates a landing point, moving to the landing point based on the control information, and performing landing at the landing point, and recognizing the multi-pattern again if the landing is not completed. A landing area for the landing of the unmanned aerial robot may include the landing point and the multi-pattern. The multi-pattern may include a first multi-pattern and a second multi-pattern. The first multi-pattern may have a greater size than the second multi-pattern.

Furthermore, the method may further include performing a movement flight for searching for a different multi-pattern and recognizing the multi-pattern again, if the multi-pattern recognition fails.

Furthermore, the method may further include performing a movement flight for searching fora different multi-pattern and recognizing the multi-pattern again, if the ID value does not indicate the landing point.

Furthermore, the method may further include searching for the second multi-pattern if both the first multi-pattern and the second multi-pattern are not recognized after recognition of the first multi-pattern is first successful.

Furthermore, the first multi-pattern and the second multi-pattern may be disposed peripherally with respect to the landing point, and the second multi-pattern may be positioned closer to the landing point compared to the first multi-pattern.

Furthermore, the second multi-pattern may have a size recognized simultaneously with the first multi-pattern at a specific altitude and may be surrounded by the first multi-pattern.

Furthermore, the first multi-pattern and the second multi-pattern may be disposed in a regular form. Current location information of the unmanned aerial robot may be obtained based on the regular form.

Furthermore, the multi-pattern may be positioned within or on top of a station. The control information may include information of an ID, direction, location, function, number of unmanned aerial robots capable of being loaded, and number of unmanned aerial robots capable of being landed, of the station.

Furthermore, the control information may include location information of the multi-pattern. The location information of the multi-pattern may include a coordinate value having the landing point as a reference point. The current location information of the unmanned aerial robot may be obtained based on an average value of the coordinate values.

Furthermore, the first multi-pattern and the second multi-pattern may have pairs having the same size and are symmetrical with respect to the landing point.

Furthermore, the method may further include adjusting a landing posture to a surface of the landing area in parallel based on a difference between the recognized sizes of the multi-pattern pairs.

Furthermore, the method may further include performing a low-altitude flight for the multi-pattern recognition if the multi-pattern recognition fails within a predetermined space or time range.

Furthermore, the landing area may be configured using a material having low reflectivity for recognition accuracy.

In another aspect, an unmanned aerial robot performing precise landing using a multi-pattern in an unmanned aerial control system includes a camera sensor receiving an image value, a transmitter for transmitting a radio signal, a receiver for receiving an UL grant and a DL grant, and a processor. The processor may be configured to receive an image value from an outside through the camera sensor and recognize a multi-pattern in which control information for precise landing control has been coded based on the image value, obtain control information when an ID value included in the control information indicates a landing point, move to the landing point based on the control information, and perform landing at the landing point, and recognize the multi-pattern again if the landing may be not completed. A landing area for the landing of the unmanned aerial robot may include the landing point and the multi-pattern. The multi-pattern may include a first multi-pattern and a second multi-pattern. The first multi-pattern may have a larger size than the second multi-pattern.

Furthermore, the processor may be configured to perform a movement flight for searching for a different multi-pattern and recognize the multi-pattern again, if the multi-pattern recognition fails.

Furthermore, the processor may be configured to perform a movement flight for searching for a different multi-pattern and recognize the multi-pattern again, if the ID value does not indicate the landing point.

Furthermore, the processor may be configured to search for the second multi-pattern if both the first multi-pattern and the second multi-pattern are not recognized after recognition of the first multi-pattern may be first successful.

Furthermore, the first multi-pattern and the second multi-pattern may have pairs having the same size and may be symmetrical with respect to the landing point.

Furthermore, the processor may be configured to adjust a landing posture to a surface of the landing area in parallel based on a difference between the recognized sizes of the multi-pattern pairs.

Furthermore, the processor may be configured to perform a low-altitude flight for the multi-pattern recognition if the multi-pattern recognition fails within a predetermined space or time range.

Advantageous Effects

According to an embodiment of the present invention, there is an effect that can be precise landing using a multi-pattern in the unmanned aerial control system.

Furthermore, according to one embodiment of the present invention, there is an effect that can be precise landing using only a low-cost camera sensor.

It will be appreciated by persons skilled in the art that the effects that could be achieved with the present invention are not limited to what has been particularly described hereinabove and the above and other effects that the present invention could achieve will be more clearly understood from the following detailed description.

DESCRIPTION OF DRAWINGS

The accompanying drawings, included as part of the detailed description in order to help understanding of the present invention, provide embodiments of the present invention and describe the technical characteristics of the present invention along with the detailed description.

FIG. 1 shows a perspective view of an unmanned aerial robot to which a method proposed in this specification may be applied.

FIG. 2 is a block diagram showing a control relation between major elements of the unmanned aerial vehicle of FIG. 1.

FIG. 3 is a block diagram showing a control relation between major elements of an aerial control system according to an embodiment of the present invention.

FIG. 4 illustrates a block diagram of a wireless communication system to which methods proposed in this specification may be applied.

FIG. 5 is a diagram showing an example of a signal transmission/reception method in a wireless communication system.

FIG. 6 shows an example of a basic operation of the robot and a 5G network in a 5G communication system.

FIG. 7 illustrates an example of a basic operation between robots using 5G communication.

FIG. 8 is a diagram showing an example of the concept diagram of a 3GPP system including a UAS.

FIG. 9 shows examples of a C2 communication model for a UAV.

FIG. 10 is a flowchart showing an example of a measurement execution method to which the present invention may be applied.

FIG. 11 illustrates elements of an unmanned aerial control system to which the present invention may be applied.

FIG. 12 is an example of a drone operation in a precise landing control method to which the present invention may be applied.

FIG. 13 is an example of pattern information for each altitude to which the present invention may be applied.

FIG. 14 is an example of a multi-pattern form according to the altitude of a drone to which the present invention may be applied.

FIG. 15 is an example of a precise landing control method to which the present invention may be applied.

FIG. 16 illustrates a block diagram of a communication device according to an embodiment of the present invention wireless.

FIG. 17 illustrates a block diagram of a communication device according to an embodiment of the present invention.

MODE FOR INVENTION

Hereinafter, embodiments disclosed in this specification are described in detail with reference to the accompanying drawings. The same or similar reference numerals are assigned to the same or similar elements regardless of their reference numerals, and redundant descriptions thereof are omitted. It is to be noted that the suffixes of elements used in the following description, such as a "module" and a "unit", are assigned or interchangeable with each other by taking into consideration only the ease of writing this specification, but in themselves are not particularly given distinct meanings and roles. Furthermore, in describing the embodiments disclosed in this specification, a detailed description of a related known technology will be omitted if it is deemed to make the gist of the present invention unnecessarily vague. Furthermore, the accompanying drawings are merely intended to make easily understood the exemplary embodiments disclosed in this specification, and the technical spirit disclosed in this specification is not restricted by the accompanying drawings and includes all modifications, equivalents, and substitutions which fall within the spirit and technological scope of the present invention.

Terms including ordinal numbers, such as the first and the second, may be used to describe various elements, but the elements are not restricted by the terms. The terms are used to only distinguish one element from the other element.

When it is said that one element is "connected" or "coupled" to the other element, it should be understood that one element may be directly connected or coupled" to the other element, but a third element may exist between the two elements. In contrast, when it is said that one element is "directly connected" or "directly coupled" to the other element, it should be understood that a third element does not exist between the two elements.

An expression of the singular number may include an expression of the plural number unless clearly defined otherwise in the context.

It is to be understood that in this application, a term, such as "include" or "have", is intended to designate that a characteristic, number, step, operation, element, part or a combination of them described in the specification is present, and does not exclude the presence or addition possibility of one or more other characteristics, numbers, steps, operations, elements, parts, or combinations of them in advance.

Hereinafter, preferred embodiments according to the present invention are described in detail with reference to the accompanying drawings. The same reference numerals are assigned to the same or similar elements regardless of their reference numerals, and redundant descriptions thereof are omitted.

FIG. 1 shows a perspective view of an unmanned aerial robot according to an embodiment of the present invention.

First, the unmanned aerial vehicle 100 is manually manipulated by an administrator on the ground, or it flies in an unmanned manner while it is automatically piloted by a configured flight program. The unmanned aerial vehicle 100, as in FIG. 1, is configured with a main body 20, the horizontal and vertical movement propulsion device 10, and landing legs 130.

The main body 20 is a body portion on which a module, such as a task unit 40, is mounted.

The horizontal and vertical movement propulsion device 10 is configured with one or more propellers 11 positioned vertically to the main body 20. The horizontal and vertical movement propulsion device 10 according to an embodiment of the present invention includes a plurality of propellers 11 and motors 12, which are spaced apart. In this case, the horizontal and vertical movement propulsion device 10 may have an air jet propeller structure not the propeller 11.

A plurality of propeller supports is radially formed in the main body 20. The motor 12 may be mounted on each of the propeller supports. The propeller 11 is mounted on each motor 12.

The plurality of propellers 11 may be disposed symmetrically with respect to the main body 20. Furthermore, the rotation direction of the motor 12 may be determined so that the clockwise and counterclockwise rotation directions of the plurality of propellers 11 are combined. The rotation direction of one pair of the propellers 11 symmetrical with respect to the main body 20 may be set identically (e.g., clockwise). Furthermore, the other pair of the propellers 11 may have a rotation direction opposite (e.g., counterclockwise) that of the one pair of the propellers 11.

The landing legs 30 are disposed with being spaced apart at the bottom of the main body 20. Furthermore, a buffering support member (not shown) for minimizing an impact attributable to a collision with the ground when the unmanned aerial vehicle 100 makes a landing may be mounted on the bottom of the landing leg 30. The unmanned aerial vehicle 100 may have various aerial vehicle structures different from that described above.

FIG. 2 is a block diagram showing a control relation between major elements of the unmanned aerial vehicle of FIG. 1.

Referring to FIG. 2, the unmanned aerial vehicle 100 measures its own flight state using a variety of types of sensors in order to fly stably. The unmanned aerial vehicle 100 may include a sensing unit 130 including at least one sensor.

The flight state of the unmanned aerial vehicle 100 is defined as rotational states and translational states.

The rotational states mean "yaw", "pitch", and "roll." The translational states mean longitude, latitude, altitude, and velocity.

In this case, "roll", "pitch", and "yaw" are called Euler angle, and indicate that the x, y, z three axes of an aircraft body frame coordinate have been rotated with respect to a given specific coordinate, for example, three axes of NED coordinates N, E, D. If the front of an aircraft is rotated left and right on the basis of the z axis of a body frame coordinate, the x axis of the body frame coordinate has an angle difference with the N axis of the NED coordinate, and this angle is called "yaw" ($\psi$). If the front of an aircraft is rotated up and down on the basis of the y axis toward the right, the z axis of the body frame coordinate has an angle difference with the D axis of the NED coordinates, and this angle is called a "pitch" ($\theta$). If the body frame of an aircraft is inclined left and right on the basis of the x axis toward the front, the y axis of the body frame coordinate has an angle to the E axis of the NED coordinates, and this angle is called "roll" ($\phi$).

The unmanned aerial vehicle 100 uses 3-axis gyroscopes, 3-axis accelerometers, and 3-axis magnetometers in order to measure the rotational states, and uses a GPS sensor and a barometric pressure sensor in order to measure the translational states.

The sensing unit 130 of the present invention includes at least one of the gyroscopes, the accelerometers, the GPS sensor, the image sensor or the barometric pressure sensor. In this case, the gyroscopes and the accelerometers measure the states in which the body frame coordinates of the unmanned aerial vehicle 100 have been rotated and accelerated with respect to earth centered inertial coordinate. The gyroscopes and the accelerometers may be fabricated as a single chip called an inertial measurement unit (IMU) using a micro-electro-mechanical systems (MEMS) semiconductor process technology.

Furthermore, the IMU chip may include a microcontroller for converting measurement values based on the earth centered inertial coordinates, measured by the gyroscopes and the accelerometers, into local coordinates, for example, north-east-down (NED) coordinates used by GPSs.

The gyroscopes measure angular velocity at which the body frame coordinate x, y, z three axes of the unmanned aerial vehicle 100 rotate with respect to the earth centered inertial coordinates, calculate values (Wx.gyro, Wy.gyro, Wz.gyro) converted into fixed coordinates, and convert the values into Euler angles ($\phi$gyro, $\theta$gyro, $\psi$gyro) using a linear differential equation.

The accelerometers measure acceleration for the earth centered inertial coordinates of the body frame coordinate x, y, z three axes of the unmanned aerial vehicle 100, calculate values (fx,acc, fy,acc, fz,acc) converted into fixed coordinates, and convert the values into "roll ($\phi$acc)" and "pitch ($\theta$acc)." The values are used to remove a bias error included in "roll ($\phi$gyro)" and "pitch ($\theta$gyro)" using measurement values of the gyroscopes.

The magnetometers measure the direction of magnetic north points of the body frame coordinate x, y, z three axes of the unmanned aerial vehicle 100, and calculate a "yaw" value for the NED coordinates of body frame coordinates using the value.

The GPS sensor calculates the translational states of the unmanned aerial vehicle 100 on the NED coordinates, that is, a latitude (Pn.GPS), a longitude (Pe.GPS), an altitude (hMSL.GPS), velocity (Vn.GPS) on the latitude, velocity (Ve.GPS) on longitude, and velocity (Vd.GPS) on the altitude, using signals received from GPS satellites. In this case, the subscript MSL means a mean sea level (MSL).

The barometric pressure sensor may measure the altitude (hALP.baro) of the unmanned aerial vehicle 100. In this case, the subscript ALP means an air-level pressor. The barometric pressure sensor calculates a current altitude from a take-off point by comparing an air-level pressor when the unmanned aerial vehicle 100 takes off with an air-level pressor at a current flight altitude.

The camera sensor may include an image sensor (e.g., CMOS image sensor), including at least one optical lens and multiple photodiodes (e.g., pixels) on which an image is focused by light passing through the optical lens, and a digital signal processor (DSP) configuring an image based on signals output by the photodiodes. The DSP may generate a moving image including frames configured with a still image, in addition to a still image.

The unmanned aerial vehicle 100 includes a communication module 170 for inputting or receiving information or outputting or transmitting information. The communication module 170 may include a drone communication unit 175 for transmitting/receiving information to/from a different external device. The communication module 170 may include an input unit 171 for inputting information. The communication module 170 may include an output unit 173 for outputting information.

The output unit 173 may be omitted from the unmanned aerial vehicle 100, and may be formed in a terminal 300.

For example, the unmanned aerial vehicle 100 may directly receive information from the input unit 171. For another example, the unmanned aerial vehicle 100 may receive information, input to a separate terminal 300 or server 200, through the drone communication unit 175.

For example, the unmanned aerial vehicle 100 may directly output information to the output unit 173. For another example, the unmanned aerial vehicle 100 may transmit information to a separate terminal 300 through the drone communication unit 175 so that the terminal 300 outputs the information.

The drone communication unit 175 may be provided to communicate with an external server 200, an external terminal 300, etc. The drone communication unit 175 may receive information input from the terminal 300, such as a smartphone or a computer. The drone communication unit 175 may transmit information to be transmitted to the terminal 300. The terminal 300 may output information received from the drone communication unit 175.

The drone communication unit 175 may receive various command signals from the terminal 300 or/and the server 200. The drone communication unit 175 may receive area information for driving, a driving route, or a driving command from the terminal 300 or/and the server 200. In this case, the area information may include flight restriction area (A) information and approach restriction distance information.

The input unit 171 may receive On/Off or various commands. The input unit 171 may receive area information. The input unit 171 may receive object information. The input unit 171 may include various buttons or a touch pad or a microphone.

The output unit 173 may notify a user of various pieces of information. The output unit 173 may include a speaker and/or a display. The output unit 173 may output information on a discovery detected while driving. The output unit 173 may output identification information of a discovery. The output unit 173 may output location information of a discovery.

The unmanned aerial vehicle 100 includes a controller 140 for processing and determining various pieces of information, such as mapping and/or a current location. The controller 140 may control an overall operation of the unmanned aerial vehicle 100 through control of various elements that configure the unmanned aerial vehicle 100.

The controller 140 may receive information from the communication module 170 and process the information. The controller 140 may receive information from the input unit 171, and may process the information. The controller 140 may receive information from the drone communication unit 175, and may process the information.

The controller 140 may receive sensing information from the sensing unit 130, and may process the sensing information.

The controller 140 may control the driving of the motor 12. The controller 140 may control the operation of the task unit 40.

The unmanned aerial vehicle 100 includes a storage unit 150 for storing various data. The storage unit 150 records various pieces of information necessary for control of the unmanned aerial vehicle 100, and may include a volatile or non-volatile recording medium.

A map for a driving area may be stored in the storage unit 150. The map may have been input by the external terminal 300 capable of exchanging information with the unmanned aerial vehicle 100 through the drone communication unit 175, or may have been autonomously learnt and generated by the unmanned aerial vehicle 100. In the former case, the external terminal 300 may include a remote controller, a PDA, a laptop, a smartphone or a tablet on which an application for a map configuration has been mounted, for example.

FIG. 3 is a block diagram showing a control relation between major elements of an aerial control system according to an embodiment of the present invention.

Referring to FIG. 3, the aerial control system according to an embodiment of the present invention may include the unmanned aerial vehicle 100 and the server 200, or may include the unmanned aerial vehicle 100, the terminal 300, and the server 200.

The unmanned aerial vehicle 100, the terminal 300, and the server 200 are interconnected using a wireless communication method.

Global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc. may be used as the wireless communication method.

A wireless Internet technology may be used as the wireless communication method. The wireless Internet technology includes a wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and 5G, for example. In particular, a faster response is possible by transmitting/receiving data using a 5G communication network.

In this specification, a base station has a meaning as a terminal node of a network that directly performs communication with a terminal. In this specification, a specific operation illustrated as being performed by a base station may be performed by an upper node of the base station in some cases. That is, it is evident that in a network configured with a plurality of network nodes including a base station, various operations performed for communication with a terminal may be performed by the base station or different network nodes other than the base station. A "base station (BS)" may be substituted with a term, such as a fixed station, a Node B, an evolved-NodeB (eNB), a base transceiver system (BTS), an access point (AP), or a next generation NodeB (gNB). Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, downlink (DL) means communication from a base station to a terminal. Uplink (UL) means communication from a terminal to a base station. In the downlink, a transmitter may be part of a base station, and a receiver may be part of a terminal. In the uplink, a transmitter may be part of a terminal, and a receiver may be part of a base station.

Specific terms used in the following description have been provided to help understanding of the present invention. The use of such a specific term may be changed into another form without departing from the technical spirit of the present invention.

Embodiments of the present invention may be supported by standard documents disclosed in at least one of IEEE 802, 3GPP and 3GPP2, that is, radio access systems. That is, steps or portions not described in order not to clearly disclose the technical spirit of the present invention in the embodiments of the present invention may be supported by the documents. Furthermore, all terms disclosed in this document may be described by the standard documents.

In order to clarity the description, 3GPP 5G is chiefly described, but the technical characteristic of the present invention is not limited thereto.

UE and 5G Network Block Diagram Example

FIG. 4 illustrates a block diagram of a wireless communication system to which methods proposed in this specification may be applied.

Referring to FIG. 4, a drone is defined as a first communication device (410 of FIG. 4). A processor 411 may perform a detailed operation of the drone.

The drone may be represented as an unmanned aerial vehicle or an unmanned aerial robot.

A 5G network communicating with a drone may be defined as a second communication device (420 of FIG. 4). A processor 421 may perform a detailed operation of the drone. In this case, the 5G network may include another drone communicating with the drone.

A 5G network maybe represented as a first communication device, and a drone may be represented as a second communication device.

For example, the first communication device or the second communication device may be a base station, a network node, a transmission terminal, a reception terminal, a wireless apparatus, a wireless communication device or a drone.

For example, a terminal or a user equipment (UE) may include a drone, an unmanned aerial vehicle (UAV), a mobile phone, a smartphone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD). For example, the HMD may be a display device of a form, which is worn on the head. For example, the HMD may be used to implement VR, AR or MR. Referring to FIG. 4, the first communication device 410, the second communication device 420 includes a processor 411, 421, a memory 414, 424, one or more Tx/Rx radio frequency (RF) modules 415, 425, a Tx processor 412, 422, an Rx processor 413, 423, and an antenna 416, 426. The Tx/Rx module is also called a transceiver. Each Tx/Rx module 415 transmits a signal each antenna 426. The processor implements the above-described function, process and/or method. The processor 421 may be related to the memory 424 for storing a program code and data. The memory may be referred to as a computer-readable recording medium. More specifically, in the DL (communication from the first communication device to the second communication device), the transmission (TX) processor 412 implements various signal processing functions for the L1 layer (i.e., physical layer). The reception (RX) processor implements various signal processing functions for the L1 layer (i.e., physical layer).

UL (communication from the second communication device to the first communication device) is processed by the first communication device 410 using a method similar to that described in relation to a receiver function in the second communication device 420. Each Tx/Rx module 425 receives a signal through each antenna 426. Each Tx/Rx module provides an RF carrier and information to the RX processor 423. The processor 421 may be related to the memory 424 for storing a program code and data. The memory may be referred to as a computer-readable recording medium.

Signal Transmission/Reception Method in Wireless Communication System

FIG. 5 is a diagram showing an example of a signal transmission/reception method in a wireless communication system.

Referring to FIG. 5, when power of a UE is newly turned on or the UE newly enters a cell, the UE performs an initial cell search task, such as performing synchronization with a BS (S501). To this end, the UE may receive a primary synchronization channel (P-SCH) and a secondary synchronization channel (S-SCH) from the BS, may perform synchronization with the BS, and may obtain information, such as a cell ID. In the LTE system and NR system, the P-SCH and the S-SCH are called a primary synchronization signal (PSS) and a secondary synchronization signal (SSS), respectively. After the initial cell search, the UE may obtain broadcast information within the cell by receiving a physical broadcast channel PBCH) form the BS. Meanwhile, the UE may identify a DL channel state by receiving a downlink reference signal (DL RS) in the initial cell search step. After the initial cell search is terminated, the UE may obtain more detailed system information by receiving a physical downlink control channel (PDCCH) and a physical downlink shared channel (PDSCH) based on information carried on the PDCCH (S502).

Meanwhile, if the UE first accesses the BS or does not have a radio resource for signal transmission, the UE may perform a random access procedure (RACH) on the BS (steps S503 to step S506). To this end, the UE may transmit a specific sequence as a preamble through a physical random access channel (PRACH) (S503 and S505), and may receive a random access response (RAR) message for the preamble through a PDSCH corresponding to a PDCCH (S504 and S506). In the case of a contention-based RACH, a contention resolution procedure may be additionally performed.

The UE that has performed the procedure may perform PDCCH/PDSCH reception (S507) and physical uplink shared channel (PUSCH)/physical uplink control channel (PUCCH) transmission (S508) as common uplink/downlink signal transmission processes. In particular, the UE receives downlink control information (DCI) through the PDCCH. The UE monitors a set of PDCCH candidates in monitoring occasions configured in one or more control element sets (CORESETs) on a serving cell based on corresponding search space configurations. A set of PDCCH candidates to be monitored by the UE is defined in the plane of search space sets. The search space set may be a common search space set or a UE-specific search space set. The CORESET is configured with a set of (physical) resource blocks having time duration of 1-3 OFDM symbols. A network may be configured so that the UE has a plurality of CORESETs. The UE monitors PDCCH candidates within one or more search space sets. In this case, the monitoring means that the UE attempts decoding on a PDCCH candidate(s) within the search space. If the UE is successful in the decoding of one of the PDCCH candidates within the search space, the UE determines that it has detected a PDCCH in a corresponding PDCCH candidate, and performs PDSCH reception or PUSCH transmission based on DCI within the detected PDCCH. The PDCCH may be used to schedule DL transmissions on the PDSCH and UL transmissions on the PUSCH. In this case, the DCI on the PDCCH includes downlink assignment (i.e., downlink (DL) grant) related to a downlink shared channel and at least including a modulation and coding format and resource allocation information, or an uplink (DL) grant related to an uplink shared channel and including a modulation and coding format and resource allocation information.

An initial access (IA) procedure in a 5G communication system is additionally described with reference to FIG. 5.

A UE may perform cell search, system information acquisition, beam alignment for initial access, DL measurement, etc. based on an SSB. The SSB is interchangeably used with a synchronization signal/physical broadcast channel (SS/PBCH) block.

An SSB is configured with a PSS, an SSS and a PBCH. The SSB is configured with four contiguous OFDM symbols. A PSS, a PBCH, an SSS/PBCH or a PBCH is transmitted for each OFDM symbol. Each of the PSS and the SSS is configured with one OFDM symbol and 127 subcarriers. The PBCH is configured with three OFDM symbols and 576 subcarriers.

Cell search means a process of obtaining, by a UE, the time/frequency synchronization of a cell and detecting the cell identifier (ID) (e.g., physical layer cell ID (PCI)) of the cell. A PSS is used to detect a cell ID within a cell ID group. An SSS is used to detect a cell ID group. A PBCH is used for SSB (time) index detection and half-frame detection.

There are 336 cell ID groups. 3 cell IDs are present for each cell ID group. A total of 1008 cell IDs are present. Information on a cell ID group to which the cell ID of a cell belongs is provided/obtained through the SSS of the cell. Information on a cell ID among the 336 cells within the cell ID is provided/obtained through a PSS.

An SSB is periodically transmitted based on SSB periodicity. Upon performing initial cell search, SSB base periodicity assumed by a UE is defined as 20 ms. After cell access, SSB periodicity may be set as one of {5 ms, 10 ms, 20 ms, 40 ms, 80 ms, 160 ms} by a network (e.g., BS).

Next, system information (SI) acquisition is described.

SI is divided into a master information block (MIB) and a plurality of system information blocks (SIBs). SI other than the MIB may be called remaining minimum system information (RMSI). The MIB includes information/parameter for the monitoring of a PDCCH that schedules a PDSCH carrying SystemInformationBlock1 (SIB1), and is transmitted by a BS through the PBCH of an SSB. SIB1 includes information related to the availability of the remaining SIBs (hereafter, SIBx, x is an integer of 2 or more) and scheduling (e.g., transmission periodicity, SI-window size). SIBx includes an SI message, and is transmitted through a PDSCH. Each SI message is transmitted within a periodically occurring time window (i.e., SI-window).

A random access (RA) process in a 5G communication system is additionally described with reference to FIG. 5.

A random access process is used for various purposes. For example, a random access process may be used for network initial access, handover, UE-triggered UL data transmission. A UE may obtain UL synchronization and an UL transmission resource through a random access process. The random access process is divided into a contention-based random access process and a contention-free random access process. A detailed procedure for the contention-based random access process is described below.

A UE may transmit a random access preamble through a PRACH as Msg1 of a random access process in the UL. Random access preamble sequences having two different lengths are supported. A long sequence length 839 is applied to subcarrier spacings of 1.25 and 5 kHz, and a short sequence length 139 is applied to subcarrier spacings of 15, 30, 60 and 120 kHz.

When a BS receives the random access preamble from the UE, the BS transmits a random access response (RAR) message (Msg2) to the UE. A PDCCH that schedules a PDSCH carrying an RAR is CRC masked with a random access (RA) radio network temporary identifier (RNTI) (RA-RNTI), and is transmitted. The UE that has detected the PDCCH masked with the RA-RNTI may receive the RAR from the PDSCH scheduled by DCI carried by the PDCCH. The UE identifies whether random access response information for the preamble transmitted by the UE, that is, Msg1, is present within the RAR. Whether random access information for Msg1 transmitted by the UE is present may be determined by determining whether a random access preamble ID for the preamble transmitted by the UE is present. If a response for Msg1 is not present, the UE may retransmit an RACH preamble within a given number, while performing power ramping. The UE calculates PRACH transmission power for the retransmission of the preamble based on the most recent pathloss and a power ramping counter.

The UE may transmit UL transmission as Msg3 of the random access process on an uplink shared channel based on random access response information. Msg3 may include an RRC connection request and a UE identity. As a response to the Msg3, a network may transmit Msg4, which may be treated as a contention resolution message on the DL. The UE may enter an RRC connected state by receiving the Msg4.

Beam Management (BM) Procedure of 5G Communication System

ABM process may be divided into (1) a DL BM process using an SSB or CSI-RS and (2) an UL BM process using a sounding reference signal (SRS). Furthermore, each BM process may include Tx beam sweeping for determining a Tx beam and Rx beam sweeping for determining an Rx beam.

A DL BM process using an SSB is described.

The configuration of beam reporting using an SSB is performed when a channel state information (CSI)/beam configuration is performed in RRC_CONNECTED.

A UE receives, from a BS, a CSI-ResourceConfig IE including CSI-SSB-ResourceSetList for SSB resources used for BM. RRC parameter csi-SSB-ResourceSetList indicates a list of SSB resources used for beam management and reporting in one resource set. In this case, the SSB resource set may be configured with {SSBx1, SSBx2, SSBx3, SSBx4, . . . }. SSB indices may be defined from 0 to 63.

The UE receives signals on the SSB resources from the BS based on the CSI-SSB-ResourceSetList.

If SSBRI and CSI-RS reportConfig related to the reporting of reference signal received power (RSRP) have been configured, the UE reports the best SSBRI and corresponding RSRP to the BS. For example, if reportQuantity of the CSI-RS reportConfig IE is configured as "ssb-Index-RSRP", the UE reports the best SSBRI and corresponding RSRP to the BS.

If a CSI-RS resource is configured in an OFDM symbol(s) identical with an SSB and "QCL-TypeD" is applicable, the UE may assume that the CSI-RS and the SSB have been quasi co-located (QCL) in the viewpoint of "QCL-TypeD." In this case, QCL-TypeD may mean that antenna ports have been QCLed in the viewpoint of a spatial Rx parameter. The UE may apply the same reception beam when it receives the signals of a plurality of DL antenna ports having a QCL-TypeD relation.

Next, a DL BM process using a CSI-RS is described.

An Rx beam determination (or refinement) process of a UE and a Tx beam sweeping process of a BS using a CSI-RS are sequentially described. In the Rx beam determination process of the UE, a parameter is repeatedly set as "ON." In the Tx beam sweeping process of the BS, a parameter is repeatedly set as "OFF."

First, the Rx beam determination process of a UE is described.

The UE receives an NZP CSI-RS resource set IE, including an RRC parameter regarding "repetition", from a BS through RRC signaling. In this case, the RRC parameter "repetition" has been set as "ON."

The UE repeatedly receives signals on a resource(s) within a CSI-RS resource set in which the RRC parameter "repetition" has been set as "ON" in different OFDM symbols through the same Tx beam (or DL spatial domain transmission filter) of the BS.

The UE determines its own Rx beam.

The UE omits CSI reporting. That is, if the RRC parameter "repetition" has been set as "ON", the UE may omit CSI reporting.

Next, the Tx beam determination process of a BS is described.

A UE receives an NZP CSI-RS resource set IE, including an RRC parameter regarding "repetition", from the BS through RRC signaling. In this case, the RRC parameter "repetition" has been set as "OFF", and is related to the Tx beam sweeping process of the BS.

The UE receives signals on resources within a CSI-RS resource set in which the RRC parameter "repetition" has been set as "OFF" through different Tx beams (DL spatial domain transmission filter) of the BS.

The UE selects (or determines) the best beam.

The UE reports, to the BS, the ID (e.g., CRI) of the selected beam and related quality information (e.g., RSRP). That is, the UE reports, to the BS, a CRI and corresponding RSRP, if a CSI-RS is transmitted for BM.

Next, an UL BM process using an SRS is described.

A UE receives, from a BS, RRC signaling (e.g., SRS-Config IE) including a use parameter configured (RRC parameter) as "beam management." The SRS-Config IE is used for an SRS transmission configuration. The SRS-Config IE includes a list of SRS-Resources and a list of SRS-ResourceSets. Each SRS resource set means a set of SRS-resources.

The UE determines Tx beamforming for an SRS resource to be transmitted based on SRS-SpatialRelation Info included in the SRS-Config IE. In this case, SRS-SpatialRelation Info is configured for each SRS resource, and indicates whether to apply the same beamforming as beamforming used in an SSB, CSI-RS or SRS for each SRS resource.

If SRS-SpatialRelationInfo is configured in the SRS resource, the same beamforming as beamforming used in the SSB, CSI-RS or SRS is applied, and transmission is performed. However, if SRS-SpatialRelationInfo is not configured in the SRS resource, the UE randomly determines Tx beamforming and transmits an SRS through the determined Tx beamforming.

Next, a beam failure recovery (BFR) process is described.

In a beamformed system, a radio link failure (RLF) frequently occurs due to the rotation, movement or beamforming blockage of a UE. Accordingly, in order to prevent an RLF from occurring frequently, BFR is supported in NR. BFR is similar to a radio link failure recovery process, and may be supported when a UE is aware of a new candidate beam(s). For beam failure detection, a BS configures beam failure detection reference signals in a UE. If the number of beam failure indications from the physical layer of the UE reaches a threshold set by RRC signaling within a period configured by the RRC signaling of the BS, the UE declares a beam failure. After a beam failure is detected, the UE triggers beam failure recovery by initiating a random access process on a PCell, selects a suitable beam, and performs beam failure recovery (if the BS has provided dedicated random access resources for certain beams, they are prioritized by the UE). When the random access procedure is completed, the beam failure recovery is considered to be completed.

Ultra-Reliable and Low Latency Communication (URLLC)

URLLC transmission defined in NR may mean transmission for (1) a relatively low traffic size, (2) a relatively low arrival rate, (3) extremely low latency requirement (e.g., 0.5, 1 ms), (4) relatively short transmission duration (e.g., 2 OFDM symbols), and (5) an urgent service/message. In the case of the UL, in order to satisfy more stringent latency requirements, transmission fora specific type of traffic (e.g., URLLC) needs to be multiplexed with another transmission (e.g., eMBB) that has been previously scheduled. As one scheme related to this, information indicating that a specific resource will be preempted is provided to a previously scheduled UE, and the URLLC UE uses the corresponding resource for UL transmission.

In the case of NR, dynamic resource sharing between eMBB and URLLC is supported. eMBB and URLLC services may be scheduled on non-overlapping time/frequency resources. URLLC transmission may occur in resources scheduled for ongoing eMBB traffic. An eMBB UE may not be aware of whether the PDSCH transmission of a corresponding UE has been partially punctured. The UE may not decode the PDSCH due to corrupted coded bits. NR provides a preemption indication by taking this into consideration. The preemption indication may also be denoted as an interrupted transmission indication.

In relation to a preemption indication, a UE receives a DownlinkPreemption IE through RRC signaling from a BS. When the UE is provided with the DownlinkPreemption IE, the UE is configured with an INT-RNTI provided by a parameter int-RNTI within a DownlinkPreemption IE for the monitoring of a PDCCH that conveys DCI format 2_1. The UE is configured with a set of serving cells by INT-ConfigurationPerServing Cell, including a set of serving cell indices additionally provided by servingCellID, and a corresponding set of locations for fields within DCI format 2_1 by positionInDCI, configured with an information payload size for DCI format 2_1 by dci-PayloadSize, and configured with the indication granularity of time-frequency resources by timeFrequencySect.

The UE receives DCI format 2_1 from the BS based on the DownlinkPreemption IE.

When the UE detects DCI format 2_1 for a serving cell within a configured set of serving cells, the UE may assume that there is no transmission to the UE within PRBs and symbols indicated by the DCI format 2_1, among a set of the (last) monitoring period of a monitoring period and a set of symbols to which the DCI format 2_1 belongs. For example, the UE assumes that a signal within a time-frequency resource indicated by preemption is not DL transmission scheduled therefor, and decodes data based on signals reported in the remaining resource region.

Massive MTC (mMTC)

Massive machine type communication (mMTC) is one of 5G scenarios for supporting super connection service for simultaneous communication with many UEs. In this environment, a UE intermittently performs communication at a very low transmission speed and mobility. Accordingly, mMTC has a major object regarding how long will be a UE driven how low the cost is. In relation to the mMTC technology, in 3GPP, MTC and NarrowBand (NB)-IoT are handled.

The mMTC technology has characteristics, such as repetition transmission, frequency hopping, retuning, and a guard period for a PDCCH, a PUCCH, a physical downlink shared channel (PDSCH), and a PUSCH.

That is, a PUSCH (or PUCCH (in particular, long PUCCH) or PRACH) including specific information and a PDSCH (or PDCCH) including a response for specific information are repeatedly transmitted. The repetition transmission is performed through frequency hopping. For the repetition transmission, (RF) retuning is performed in a guard period from a first frequency resource to a second frequency resource. Specific information and a response for the specific information may be transmitted/received through a narrowband (e.g., 6 RB (resource block) or 1 RB).

Robot Basic Operation Using 5G Communication

FIG. 6 shows an example of a basic operation of the robot and a 5G network in a 5G communication system.

A robot transmits specific information transmission to a 5G network (S1). Furthermore, the 5G network may determine whether the robot is remotely controlled (S2). In this case, the 5G network may include a server or module for performing robot-related remote control.

Furthermore, the 5G network may transmit, to the robot, information (or signal) related to the remote control of the robot (S3).

Application Operation Between Robot and 5G Network in 5G Communication System

Hereafter, a robot operation using 5G communication is described more specifically with reference to FIGS. 1 to 6 and the above-described wireless communication technology (BM procedure, URLLC, mMTC).

First, a basic procedure of a method to be proposed later in the present invention and an application operation to which the eMBB technology of 5G communication is applied is described.

As in steps S1 and S3 of FIG. 3, in order for a robot to transmit/receive a signal, information, etc. to/from a 5G network, the robot performs an initial access procedure and a random access procedure along with a 5G network prior to step S1 of FIG. 3.

More specifically, in order to obtain DL synchronization and system information, the robot performs an initial access procedure along with the 5G network based on an SSB. In the initial access procedure, a beam management (BM) process and a beam failure recovery process may be added. In a process for the robot to receive a signal from the 5G network, a quasi-co location (QCL) relation may be added.

Furthermore, the robot performs a random access procedure along with the 5G network for UL synchronization acquisition and/or UL transmission. Furthermore, the 5G network may transmit an UL grant for scheduling the transmission of specific information to the robot. Accordingly, the robot transmits specific information to the 5G network based on the UL grant. Furthermore, the 5G network transmits, to the robot, a DL grant for scheduling the transmission of a 5G processing result for the specific information. Accordingly, the 5G network may transmit, to the robot, information (or signal) related to remote control based on the DL grant.

A basic procedure of a method to be proposed later in the present invention and an application operation to which the URLLC technology of 5G communication is applied is described below.

As described above, after a robot performs an initial access procedure and/or a random access procedure along with a 5G network, the robot may receive a DownlinkPreemption IE from the 5G network. Furthermore, the robot receives, from the 5G network, DCI format 2_1 including pre-emption indication based on the DownlinkPreemption IE. Furthermore, the robot does not perform (or expect or assume) the reception of eMBB data in a resource (PRB and/or OFDM symbol) indicated by the pre-emption indication. Thereafter, if the robot needs to transmit specific information, it may receive an UL grant from the 5G network.

A basic procedure of a method to be proposed later in the present invention and an application operation to which the mMTC technology of 5G communication is applied is described below.

A portion made different due to the application of the mMTC technology among the steps of FIG. 6 is chiefly described.

In step S1 of FIG. 6, the robot receives an UL grant from the 5G network in order to transmit specific information to the 5G network. In this case, the UL grant includes information on the repetition number of transmission of the specific information. The specific information may be repeatedly transmitted based on the information on the repetition number. That is, the robot transmits specific information to the 5G network based on the UL grant. Furthermore, the repetition transmission of the specific information may be performed through frequency hopping. The transmission of first specific information may be performed in a first frequency resource, and the transmission of second specific information may be performed in a second frequency resource. The specific information may be transmitted through the narrowband of 6 resource blocks (RBs) or 1 RB.

Operation Between Robots Using 5G Communication

FIG. 7 illustrates an example of a basic operation between robots using 5G communication.

A first robot transmits specific information to a second robot (S61). The second robot transmits, to the first robot, a response to the specific information (S62).

Meanwhile, the configuration of an application operation between robots may be different depending on whether a 5G network is involved directly (sidelink communication transmission mode 3) or indirectly (sidelink communication transmission mode 4) in the specific information, the resource allocation of a response to the specific information.

An application operation between robots using 5G communication is described below.

First, a method for a 5G network to be directly involved in the resource allocation of signal transmission/reception between robots is described.

The 5G network may transmit a DCI format 5A to a first robot for the scheduling of mode 3 transmission (PSCCH and/or PSSCH transmission). In this case, the physical sidelink control channel (PSCCH) is a 5G physical channel for the scheduling of specific information transmission, and the physical sidelink shared channel (PSSCH) is a 5G physical channel for transmitting the specific information. Furthermore, the first robot transmits, to a second robot, an SCI format 1 for the scheduling of specific information transmission on a PSCCH. Furthermore, the first robot transmits specific information to the second robot on the PSSCH.

A method for a 5G network to be indirectly involved in the resource allocation of signal transmission/reception is described below.

A first robot senses a resource for mode 4 transmission in a first window. Furthermore, the first robot selects a resource for mode 4 transmission in a second window based on a result of the sensing. In this case, the first window means a sensing window, and the second window means a selection window. The first robot transmits, to the second robot, an SCI format 1 for the scheduling of specific information transmission on a PSCCH based on the selected resource. Furthermore, the first robot transmits specific information to the second robot on a PSSCH.

The above-described structural characteristic of the drone, the 5G communication technology, etc. may be combined with methods to be described, proposed in the present inventions, and may be applied or may be supplemented to materialize or clarify the technical characteristics of methods proposed in the present inventions.

Drone

Unmanned aerial system: a combination of a UAV and a UAV controller

Unmanned aerial vehicle: an aircraft that is remotely piloted without a human pilot, and it may be represented as an unmanned aerial robot, a drone, or simply a robot.

UAV controller: device used to control a UAV remotely

ATC: Air Traffic Control

NLOS: Non-line-of-sight

UAS: Unmanned Aerial System

UAV: Unmanned Aerial Vehicle

UCAS: Unmanned Aerial Vehicle Collision Avoidance System

UTM: Unmanned Aerial Vehicle Traffic Management

C2: Command and Control

FIG. 8 is a diagram showing an example of the concept diagram of a 3GPP system including a UAS.

An unmanned aerial system (UAS) is a combination of an unmanned aerial vehicle (UAV), sometimes called a drone, and a UAV controller. The UAV is an aircraft not including a human pilot device. Instead, the UAV is controlled by a terrestrial operator through a UAV controller, and may have autonomous flight capabilities. A communication system between the UAV and the UAV controller is provided by the 3GPP system. In terms of the size and weight, the range of the UAV is various from a small and light aircraft that is frequently used for recreation purposes to a large and heavy aircraft that may be more suitable for commercial purposes. Regulation requirements are different depending on the range and are different depending on the area.

Communication requirements for a UAS include data uplink and downlink to/from a UAS component for both a serving 3GPP network and a network server, in addition to a command and control (C2) between a UAV and a UAV controller. Unmanned aerial system traffic management (UTM) is used to provide UAS identification, tracking, authorization, enhancement and the regulation of UAS operations and to store data necessary for a UAS for an operation. Furthermore, the UTM enables a certified user (e.g., air traffic control, public safety agency) to query an identity (ID), the meta data of a UAV, and the controller of the UAV.

The 3GPP system enables UTM to connect a UAV and a UAV controller so that the UAV and the UAV controller are identified as a UAS. The 3GPP system enables the UAS to transmit, to the UTM, UAV data that may include the following control information.

Control information: a unique identity (this may be a 3GPP identity), UE capability, manufacturer and model, serial number, take-off weight, location, owner identity, owner address, owner contact point detailed information, owner certification, take-off location, mission type, route data, an operating status of a UAV.

The 3GPP system enables a UAS to transmit UAV controller data to UTM. Furthermore, the UAV controller data may include a unique ID (this may be a 3GPP ID), the UE function, location, owner ID, owner address, owner contact point detailed information, owner certification, UAV operator identity confirmation, UAV operator license, UAV operator certification, UAV pilot identity, UAV pilot license, UAV pilot certification and flight plan of a UAV controller.

The functions of a 3GPP system related to a UAS may be summarized as follows.

A 3GPP system enables the UAS to transmit different UAS data to UTM based on different certification and an authority level applied to the UAS.

A 3GPP system supports a function of expanding UAS data transmitted to UTM along with future UTM and the evolution of a support application.

A 3GPP system enables the UAS to transmit an identifier, such as international mobile equipment identity (IMEI), a mobile station international subscriber directory number (MSISDN) or an international mobile subscriber identity (IMSI) or IP address, to UTM based on regulations and security protection.

A 3GPP system enables the UE of a UAS to transmit an identity, such as an IMEI, MSISDN or IMSI or IP address, to UTM.

A 3GPP system enables a mobile network operator (MNO) to supplement data transmitted to UTM, along with network-based location information of a UAV and a UAV controller.

A 3GPP system enables MNO to be notified of a result of permission so that UTM operates.

A 3GPP system enables MNO to permit a UAS certification request only when proper subscription information is present.

A 3GPP system provides the ID(s) of a UAS to UTM.

A 3GPP system enables a UAS to update UTM with live location information of a UAV and a UAV controller.

A 3GPP system provides UTM with supplement location information of a UAV and a UAV controller.

A 3GPP system supports UAVs, and corresponding UAV controllers are connected to other PLMNs at the same time.

A 3GPP system provides a function for enabling the corresponding system to obtain UAS information on the support of a 3GPP communication capability designed for a UAS operation.

A 3GPP system supports UAS identification and subscription data capable of distinguishing between a UAS having a UAS capable UE and a USA having a non-UAS capable UE.

A 3GPP system supports detection, identification, and the reporting of a problematic UAV(s) and UAV controller to UTM.

In the service requirement of Rel-16 ID_UAS, the UAS is driven by a human operator using a UAV controller in order to control paired UAVs. Both the UAVs and the UAV controller are connected using two individual connections over a 3GPP network for a command and control (C2) communication. The first contents to be taken into consideration with respect to a UAS operation include a mid-air collision danger with another UAV, a UAV control failure danger, an intended UAV misuse danger and various dangers of a user (e.g., business in which the air is shared, leisure activities). Accordingly, in order to avoid a danger in safety, if a 5G network is considered as a transmission network, it is important to provide a UAS service by QoS guarantee for C2 communication.

FIG. 9 shows examples of a C2 communication model for a UAV.

Model-A is direct C2. A UAV controller and a UAV directly configure a C2 link (or C2 communication) in order to communicate with each other, and are registered with a 5G network using a wireless resource that is provided, configured and scheduled by the 5G network, for direct C2 communication. Model-B is indirect C2. A UAV controller and a UAV establish and register respective unicast C2 communication links for a 5G network, and communicate with each other over the 5G network. Furthermore, the UAV controller and the UAV may be registered with the 5G network through different NG-RAN nodes. The 5G network supports a mechanism for processing the stable routing of C2 communication in any cases. A command and control use C2 communication for forwarding from the UAV controller/UTM to the UAV. C2 communication of this type (model-B) includes two different lower classes for incorporating a different distance between the UAV and the UAV controller/UTM, including a line of sight (VLOS) and a non-line of sight (non-VLOS). Latency of this VLOS traffic type needs to take into consideration a command delivery time, a human response time, and an assistant medium, for example, video streaming, the indication of a transmission waiting time. Accordingly, sustainable latency of the VLOS is shorter than that of the Non-VLOS. A 5G network configures each session for a UAV and a UAV controller. This session communicates with UTM, and may be used for default C2 communication with a UAS.

As part of a registration procedure or service request procedure, a UAV and a UAV controller request a UAS operation from UTM, and provide a pre-defined service class or requested UAS service (e.g., navigational assistance service, weather), identified by an application ID(s), to the UTM. The UTM permits the UAS operation for the UAV and the UAV controller, provides an assigned UAS service, and allocates a temporary UAS-ID to the UAS. The UTM provides a 5G network with information necessary for the C2 communication of the UAS. For example, the information may include a service class, the traffic type of UAS service, requested QoS of the permitted UAS service, and the subscription of the UAS service. When a request to establish C2 communication with the 5G network is made, the UAV and the UAV controller indicate a preferred C2 communication model (e.g., model-B) along with the UAS-ID allocated to the 5G network. If an additional C2 communication connection is to be generated or the configuration of the existing data connection for C2 needs to be changed, the 5G network modifies or allocates one or more QoS flows for C2 communication traffic based on requested QoS and priority in the approved UAS service information and C2 communication of the UAS.

UAV Traffic Management (1) Centralized UAV Traffic Management

A 3GPP system provides a mechanism that enables UTM to provide a UAV with route data along with flight permission. The 3GPP system forwards, to a UAS, route modification information received from the UTM with latency of less than 500 ms. The 3GPP system needs to forward notification, received from the UTM, to a UAV controller having a waiting time of less than 500 ms.

(2) De-Centralized UAV Traffic Management

A 3GPP system broadcasts the following data (e.g., if it is requested based on another regulation requirement, UAV identities, UAV type, a current location and time, flight route information, current velocity, operation state) so that a UAV identifies a UAV(s) in a short-distance area for collision avoidance.

A 3GPP system supports a UAV in order to transmit a message through a network connection for identification between different UAVs. The UAV preserves owner's personal information of a UAV, UAV pilot and UAV operator in the broadcasting of identity information.

A 3GPP system enables a UAV to receive local broadcasting communication transmission service from another UAV in a short distance.

A UAV may use direct UAV versus UAV local broadcast communication transmission service in or out of coverage of a 3GPP network, and may use the direct UAV versus UAV local broadcast communication transmission service if transmission/reception UAVs are served by the same or different PLMNs.

A 3GPP system supports the direct UAV versus UAV local broadcast communication transmission service at a relative velocity of a maximum of 320 kmph. The 3GPP system supports the direct UAV versus UAV local broadcast communication transmission service having various types of message payload of 50-1500 bytes other than security-related message elements.

A 3GPP system supports the direct UAV versus UAV local broadcast communication transmission service capable of guaranteeing separation between UAVs. In this case, the UAVs may be considered to have been separated if they are in a horizontal distance of at least 50 m or a vertical distance of 30 m or both. The 3GPP system supports the direct UAV versus UAV local broadcast communication transmission service that supports the range of a maximum of 600 m.

A 3GPP system supports the direct UAV versus UAV local broadcast communication transmission service capable of transmitting a message with frequency of at least 10 message per second, and supports the direct UAV versus UAV local broadcast communication transmission service capable of transmitting a message whose inter-terminal waiting time is a maximum of 100 ms.

A UAV may broadcast its own identity locally at least once per second, and may locally broadcast its own identity up to a 500 m range.

Security

A 3GPP system protects data transmission between a UAS and UTM. The 3GPP system provides protection against the spoofing attack of a UAS ID. The 3GPP system permits the non-repudiation of data, transmitted between the UAS and the UTM, in the application layer. The 3GPP system supports the integrity of a different level and the capability capable of providing a personal information protection function with respect to a different connection between the UAS and the UTM, in addition to data transmitted through a UAS and UTM connection. The 3GPP system supports the classified protection of an identity and personal identification information related to the UAS. The 3GPP system supports regulation requirements (e.g., lawful intercept) for UAS traffic.

When a UAS requests the authority capable of accessing UAS data service from an MNO, the MNO performs secondary check (after initial mutual certification or simultaneously with it) in order to establish UAS qualification verification to operate. The MNO is responsible for transmitting and potentially adding additional data to the request so that the UAS operates as unmanned aerial system traffic management (UTM). In this case, the UTM is a 3GPP entity. The UTM is responsible for the approval of the UAS that operates and identifies the qualification verification of the UAS and the UAV operator. One option is that the UTM is managed by an aerial traffic control center. The aerial traffic control center stores all data related to the UAV, the UAV controller, and live location. When the UAS fails in any part of the check, the MNO may reject service for the UAS and thus may reject operation permission.

3GPP Support for Aerial UE (or Drone) Communication

An E-UTRAN-based mechanism that provides an LTE connection to a UE capable of aerial communication is supported through the following functions.

Subscription-based aerial UE identification and authorization defined in Section TS 23.401, 4.3.31.

Height reporting based on an event in which the altitude of a UE exceeds a reference altitude threshold configured with a network.

Interference detection based on measurement reporting triggered when the number of configured cells (i.e., greater than 1) satisfies a triggering criterion at the same time.

Signaling of flight route information from a UE to an E-UTRAN.

Location information reporting including the horizontal and vertical velocity of a UE.

(1) Subscription-Based Identification of Aerial UE Function

The support of the aerial UE function is stored in user subscription information of an HSS. The HSS transmits the information to an MME in an Attach, Service Request and Tracking Area Update process. The subscription information may be provided from the MME to a base station through an S1 AP initial context setup request during the Attach, tracking area update and service request procedure. Furthermore, in the case of X2-based handover, a source base station (BS) may include subscription information in an X2-AP Handover Request message toward a target BS. More detailed contents are described later. With respect to intra and inter MME S1-based handover, the MME provides subscription information to the target BS after the handover procedure.

(2) Height-Based Reporting for Aerial UE Communication

An aerial UE may be configured with event-based height reporting. The aerial UE transmits height reporting when the altitude of the UE is higher or lower than a set threshold. The reporting includes height and a location.

(3) Interference Detection and Mitigation for Aerial UE Communication

For interference detection, when each (per cell) RSRP value for the number of configured cells satisfies a configured event, an aerial UE may be configured with an RRM event A3, A4 or A5 that triggers measurement reporting. The reporting includes an RRM result and location. For interference mitigation, the aerial UE may be configured with a dedicated UE-specific alpha parameter for PUSCH power control.

(4) Flight Route Information Reporting

An E-UTRAN may request a UE to report flight route information configured with a plurality of middle points defined as 3D locations, as defined in TS 36.355. If the flight route information is available for the UE, the UE reports a waypoint for a configured number. The reporting may also include a time stamp per waypoint if it is configured in the request and available for the UE.

(5) Location Reporting for Aerial UE Communication

Location information for aerial UE communication may include a horizontal and vertical velocity if they have been configured. The location information may be included in the RRM reporting and the height reporting.

Hereafter, (1) to (5) of 3GPP support for aerial UE communication is described more specifically.

DL/UL Interference Detection

For DL interference detection, measurements reported by a UE may be useful. UL interference detection may be performed based on measurement in a base station or may be estimated based on measurements reported by a UE. Interference detection can be performed more effectively by improving the existing measurement reporting mechanism. Furthermore, for example, other UE-based information, such as mobility history reporting, speed estimation, a timing advance adjustment value, and location information, may be used by a network in order to help interference detection. More detailed contents of measurement execution are described later.

DL Interference Mitigation

In order to mitigate DL interference in an aerial UE, LTE Release-13 FD-MIMO may be used. Although the density of aerial UEs is high, Rel-13 FD-MIMO may be advantageous in restricting an influence on the DL terrestrial UE throughput, while providing a DL aerial UE throughput that satisfies DL aerial UE throughput requirements. In order to mitigate DL interference in an aerial UE, a directional antenna may be used in the aerial UE. In the case of a high-density aerial UE, a directional antenna in the aerial UE may be advantageous in restricting an influence on a DL terrestrial UE throughput. The DL aerial UE throughput has been improved compared to a case where a non-directional antenna is used in the aerial UE. That is, the directional antenna is used to mitigate interference in the downlink for aerial UEs by reducing interference power from wide angles. In the viewpoint that a LOS direction between an aerial UE and a serving cell is tracked, the following types of capability are taken into consideration:

1) Direction of Travel (DoT): an aerial UE does not recognize the direction of a serving cell LOS, and the antenna direction of the aerial UE is aligned with the DoT.

2) Ideal LOS: an aerial UE perfectly tracks the direction of a serving cell LOS and pilots the line of sight of an antenna toward a serving cell.

3) Non-ideal LOS: an aerial UE tracks the direction of a serving cell LOS, but has an error due to actual restriction.

In order to mitigate DL interference with aerial UEs, beamforming in aerial UEs may be used. Although the density of aerial UEs is high, beamforming in the aerial UEs may be advantageous in restricting an influence on a DL terrestrial UE throughput and improving a DL aerial UE throughput. In order to mitigate DL interference in an aerial UE, intra-site coherent JT CoMP may be used. Although the density of aerial UEs is high, the intra-site coherent JT can improve the throughput of all UEs. An LTE Release-13 coverage extension technology for non-bandwidth restriction devices may also be used. In order to mitigate DL interference in an aerial UE, a coordinated data and control transmission method may be used. An advantage of the coordinated data and control transmission method is to increase an aerial UE throughput, while restricting an influence on a terrestrial UE throughput. It may include signaling for indicating a dedicated DL resource, an option for cell muting/ABS, a procedure update for cell (re)selection, acquisition for being applied to a coordinated cell, and the cell ID of a coordinated cell.

UL Interference Mitigation

In order to mitigate UL interference caused by aerial UEs, an enhanced power control mechanisms may be used. Although the density of aerial UEs is high, the enhanced power control mechanism may be advantageous in restricting an influence on a UL terrestrial UE throughput.

The above power control-based mechanism influences the following contents.

UE-specific partial pathloss compensation factor
UE-specific Po parameter
Neighbor cell interference control parameter
Closed-loop power control The power control-based mechanism for UL interference mitigation is described more specifically.

1) UE-Specific Partial Pathloss Compensation Factor

The enhancement of the existing open-loop power control mechanism is taken into consideration in the place where a UE-specific partial pathloss compensation factor $\alpha_{UE}$ is introduced. Due to the introduction of the UE-specific partial pathloss compensation factor $\alpha_{UE}$, different $\alpha_{UE}$ may be configured by comparing an aerial UE with a partial pathloss compensation factor configured in a terrestrial UE.

2) UE-Specific P0 Parameter

Aerial UEs are configured with different Po compared with Po configured for terrestrial UEs. The enhance of the existing power control mechanism is not necessary because the UE-specific Po is already supported in the existing open-loop power control mechanism.

Furthermore, the UE-specific partial pathloss compensation factor $\alpha_{UE}$ and the UE-specific Po may be used in common for uplink interference mitigation. Accordingly, the UE-specific partial pathloss compensation factor $\alpha_{UE}$ and the UE-specific Po can improve the uplink throughput of a terrestrial UE, while scarifying the reduced uplink throughput of an aerial UE.

3) Closed-Loop Power Control

Target reception power for an aerial UE is coordinated by taking into consideration serving and neighbor cell measurement reporting. Closed-loop power control for aerial UEs needs to handle a potential high-speed signal change in the sky because aerial UEs may be supported by the sidelobes of base station antennas.

In order to mitigate UL interference attributable to an aerial UE, LTE Release-13 FD-MIMO may be used. In order to mitigate UL interference caused by an aerial UE, a UE-directional antenna may be used. In the case of a high-density aerial UE, a UE-directional antenna may be advantageous in restricting an influence on an UL terrestrial UE throughput. That is, the directional UE antenna is used to reduce uplink interference generated by an aerial UE by reducing a wide angle range of uplink signal power from the aerial UE. The following type of capability is taken into consideration in the viewpoint in which an LOS direction between an aerial UE and a serving cell is tracked:

1) Direction of Travel (DoT): an aerial UE does not recognize the direction of a serving cell LOS, and the antenna direction of the aerial UE is aligned with the DoT.

2) Ideal LOS: an aerial UE perfectly tracks the direction of a serving cell LOS and pilots the line of sight of the antenna toward a serving cell.

3) Non-ideal LOS: an aerial UE tracks the direction of a serving cell LOS, but has an error due to actual restriction.

A UE may align an antenna direction with an LOS direction and amplify power of a useful signal depending on the capability of tracking the direction of an LOS between the aerial UE and a serving cell. Furthermore, UL transmission beamforming may also be used to mitigate UL interference.

Mobility

Mobility performance (e.g., a handover failure, a radio link failure (RLF), handover stop, a time in Qout) of an aerial UE is weakened compared to a terrestrial UE. It is expected that the above-described DL and UL interference mitigation technologies may improve mobility performance for an aerial UE. Better mobility performance in a rural area network than in an urban area network is monitored. Furthermore, the existing handover procedure may be improved to improve mobility performance.

Improvement of a handover procedure for an aerial UE and/or mobility of a handover-related parameter based on location information and information, such as the aerial state of a UE and a flight route plan A measurement reporting mechanism may be improved in such a way as to define a new event, enhance a trigger condition, and control the quantity of measurement reporting.

The existing mobility enhancement mechanism (e.g., mobility history reporting, mobility state estimation, UE support information) operates for an aerial UE and may be first evaluated if additional improvement is necessary. A parameter related to a handover procedure for an aerial UE may be improved based on aerial state and location information of the UE. The existing measurement reporting mechanism may be improved by defining a new event, enhancing a triggering condition, and controlling the quantity of measurement reporting. Flight route plan information may be used for mobility enhancement.

A measurement execution method which may be applied to an aerial UE is described more specifically.

FIG. 10 is a flowchart showing an example of a measurement execution method to which the present invention may be applied.

An aerial UE receives measurement configuration information from a base station (S1010). In this case, a message including the measurement configuration information is called a measurement configuration message. The aerial UE performs measurement based on the measurement configuration information (S1020). If a measurement result satisfies a reporting condition within the measurement configuration information, the aerial UE reports the measurement result to the base station (S1030). A message including the measurement result is called a measurement report message. The measurement configuration information may include the following information.

(1) Measurement object information: this is information on an object on which an aerial UE will perform measurement. The measurement object includes at least one of an intra-frequency measurement object that is an object of measurement within a cell, an inter-frequency measurement object that is an object of inter-cell measurement, or an inter-RAT measurement object that is an object of inter-RAT measurement. For example, the intra-frequency measurement object may indicate a neighbor cell having the same frequency band as a serving cell. The inter-frequency measurement object may indicate a neighbor cell having a frequency band different from that of a serving cell. The inter-RAT measurement object may indicate a neighbor cell of an RAT different from the RAT of a serving cell.

(2) Reporting configuration information: this is information on a reporting condition and reporting type regarding when an aerial UE reports the transmission of a measurement result. The reporting configuration information may be configured with a list of reporting configurations. Each reporting configuration may include a reporting criterion and a reporting format. The reporting criterion is a level in which the transmission of a measurement result by a UE is triggered. The reporting criterion may be the periodicity of measurement reporting or a single event for measurement reporting. The reporting format is information regarding that an aerial UE will configure a measurement result in which type.

An event related to an aerial UE includes (i) an event H1 and (ii) an event H2.

Event H1 (Aerial UE Height Exceeding a Threshold)

A UE considers that an entering condition for the event is satisfied when 1) the following defined condition H1-1 is satisfied, and considers that a leaving condition for the event is satisfied when 2) the following defined condition H1-2 is satisfied.

$Ms-Hys>\text{Thresh}+\text{Offset}$     Inequality H1-1 (entering condition):

$Ms+Hys<\text{Thresh}+\text{Offset}$     Inequality H1-2 (leaving condition):

In the above equation, the variables are defined as follows.

Ms is an aerial UE height and does not take any offset into consideration. Hys is a hysteresis parameter (i.e., h1-hysteresis as defined in ReportConfigEUTRA) for an event. Thresh is a reference threshold parameter variable for the event designated in MeasConfig (i.e., heightThreshRef defined within MeasConfig). Offset is an offset value for heightThreshRef for obtaining an absolute threshold for the event (i.e., h1-ThresholdOffset defined in ReportConfigEUTRA). Ms is indicated in meters. Thresh is represented in the same unit as Ms.

Event H2 (Aerial UE Height of Less than Threshold)

A UE considers that an entering condition for an event is satisfied 1) the following defined condition H2-1 is satisfied, and considers that a leaving condition for the event is satisfied 2) when the following defined condition H2-2 is satisfied.

$Ms+Hys<\text{Thresh}+\text{Offset}$     Inequality H2-1 (entering condition):

$Ms-Hys>\text{Thresh}+\text{Offset}$     Inequality H2-2 (leaving condition):

In the above equation, the variables are defined as follows.

Ms is an aerial UE height and does not take any offset into consideration. Hys is a hysteresis parameter (i.e., h1-hysteresis as defined in ReportConfigEUTRA) for an event. Thresh is a reference threshold parameter variable for the event designated in MeasConfig (i.e., heightThreshRef defined within MeasConfig). Offset is an offset value for heightThreshRef for obtaining an absolute threshold for the event (i.e., h2-ThresholdOffset defined in ReportConfigEUTRA). Ms is indicated in meters. Thresh is represented in the same unit as Ms.

(3) Measurement identity information: this is information on a measurement identity by which an aerial UE determines to report which measurement object using which type by associating the measurement object and a reporting configuration. The measurement identity information is included in a measurement report message, and may indicate that a measurement result is related to which measurement object and that measurement reporting has occurred according to which reporting condition.

(4) Quantity configuration information: this is information on about a parameter for configuration of measurement unit, reporting unit and/or filtering of measurement result value.

(5) Measurement gap information: this is information on a measurement gap, that is, an interval which may be used by an aerial UE in order to perform only measurement without taking into consideration data transmission with a serving cell because downlink transmission or uplink transmission has not been scheduled in the aerial UE.

In order to perform a measurement procedure, an aerial UE has a measurement object list, a measurement reporting configuration list, and a measurement identity list. If a measurement result of the aerial UE satisfies a configured event, the UE transmits a measurement report message to a base station.

In this case, the following parameters may be included in a UE-EUTRA-Capability Information Element in relation to the measurement reporting of the aerial UE. IE UE-EUTRA-Capability is used to forward, to a network, an E-RA UE Radio Access Capability parameter and a function group indicator for an essential function. IE UE-EUTRA-Capability is transmitted in an E-UTRA or another RAT. Table 1 is a table showing an example of the UE-EUTRA-Capability IE.

TABLE 1

```
--ASN1START..... MeasParameters-v1530 ::=    SEQUENCE    {qoe-
MeasReport-r15
ENUMERATED {supported} OPTIONAL, qoe-MTSI-MeasReport-r15
ENUMERATED {supported} OPTIONAL, ca-IdleModeMeasurements-r15
ENUMERATED {supported} OPTIONAL, ca-IdleModeValidityArea-r15
ENUMERATED {supported} OPTIONAL, heightMeas-r15  ENUMERATED
{supported}  OPTIONAL, multipleCellsMeasExtension-r15
ENUMERATED {supported} OPTIONAL}.....
```

The heightMeas-r15 field defines whether a UE supports height-based measurement reporting defined in TS 36.331. As defined in TS 23.401, to support this function with respect to a UE having aerial UE subscription is essential. The multipleCellsMeasExtension-r15 field defines whether a UE supports measurement reporting triggered based on a plurality of cells. As defined in TS 23.401, to support this function with respect to a UE having aerial UE subscription is essential.

UAV UE Identification

A UE may indicate a radio capability in a network which may be used to identify a UE having a related function for supporting a UAV-related function in an LTE network. A permission that enables a UE to function as an aerial UE in the 3GPP network may be aware based on subscription information transmitted from the MME to the RAN through S1 signaling. Actual "aerial use" certification/license/restriction of a UE and a method of incorporating it into subscription information may be provided from a Non-3GPP node to a 3GPP node. A UE in flight may be identified using UE-based reporting (e.g., mode indication, altitude or location information during flight, an enhanced measurement reporting mechanism (e.g., the introduction of a new event) or based on mobility history information available in a network.

Subscription Handling for Aerial UE

The following description relates to subscription information processing for supporting an aerial UE function through the E-UTRAN defined in TS 36.300 and TS 36.331. An eNB supporting aerial UE function handling uses information for each user, provided by the MME, in order to determine whether the UE can use the aerial UE function. The support of the aerial UE function is stored in subscription information of a user in the HSS. The HSS transmits the information to the MME through a location update message during an attach and tracking area update procedure. A home operator may cancel the subscription approval of the user for operating the aerial UE at any time. The MME supporting the aerial UE function provides the eNB with subscription information of the user for aerial UE approval through an S1 AP initial context setup request during the attach, tracking area update and service request procedure.

An object of an initial context configuration procedure is to establish all required initial UE context, including E-RAB context, a security key, a handover restriction list, a UE radio function, and a UE security function. The procedure uses UE-related signaling.

In the case of Inter-RAT handover to intra- and inter-MME S1 handover (intra RAT) or E-UTRAN, aerial UE subscription information of a user includes an S1-AP UE context modification request message transmitted to a target BS after a handover procedure.

An object of a UE context change procedure is to partially change UE context configured as a security key or a subscriber profile ID for RAT/frequency priority, for example. The procedure uses UE-related signaling.

In the case of X2-based handover, aerial UE subscription information of a user is transmitted to a target BS as follows:

If a source BS supports the aerial UE function and aerial UE subscription information of a user is included in UE context, the source BS includes corresponding information in the X2-AP handover request message of a target BS.

An MME transmits, to the target BS, the aerial UE subscription information in a Path Switch Request Acknowledge message.

An object of a handover resource allocation procedure is to secure, by a target BS, a resource for the handover of a UE.

If aerial UE subscription information is changed, updated aerial UE subscription information is included in an S1-AP UE context modification request message transmitted to a BS.

Table 2 is a table showing an example of the aerial UE subscription information.

TABLE 2

| IE/Group Name | Presence | Range | IE type and reference |
|---|---|---|---|
| Aerial UE subscription information | M | | ENUMERATED (allowed, not allowed, . . .) |

Aerial UE subscription information is used by a BS in order to know whether a UE can use the aerial UE function.

Combination of Drone and eMBB

A 3GPP system can support data transmission for a UAV (aerial UE or drone) and for an eMBB user at the same time.

A base station may need to support data transmission for an aerial UAV and a terrestrial eMBB user at the same time under a restricted bandwidth resource. For example, in a live broadcasting scenario, a UAV of 100 meters or more requires a high transmission speed and a wide bandwidth because it has to transmit, to a base station, a captured figure or video in real time. At the same time, the base station needs to provide a requested data rate to terrestrial users (e.g., eMBB users). Furthermore, interference between the two types of communications needs to be minimized.

FIG. 11 illustrates elements of an unmanned aerial control system to which the present invention may be applied.

The unmanned aerial control system to which the present invention may be applied includes an unmanned aerial vehicle (may be substituted with a drone or unmanned aerial robot in the present invention) 1100, a station 1130, a first multi-pattern 1110, and a second multi-pattern 1120.

The station 1130 may be plural. Each of the stations 1130 may be identified based on a unique identifier (ID). A station ID is assigned to the drone 1100, so the station 1130, that is, the target of landing, take-off, charging and/or storage, may be allocated to the drone.

The drone 1100 may be plural, and each of the drones 1100 may be identified based on a unique identifier (ID). The drone 1100, that is, the target of an operation of the station 1130, may be allocated to the station 1130 through a drone ID.

In particular, for precise landing control of the drone 1100, the multi-patterns 1110 and 1120 may be used. The drone 1100 may recognize coded multi-patterns 1110 and 1120 based on a camera image, and may obtain information for landing control. The multi-patterns 1110 and 1120 may be positioned at a proper landing point based on the design of the station 1130 and/or an operating method of the unmanned aerial control system. The multi-patterns 1110 and 1120 may be positioned within or on top of the station 1130, and may be positioned separately from the station 1130.

The multi-patterns 1110 and 1120 include the first multi-pattern 1110 and the second multi-pattern 1120. The first multi-pattern 1110 and the second multi-pattern 1120 have different sizes, and whether they can be recognized may be different depending on the altitude of the drone 1100. The first multi-pattern 1110 may have a larger size than the second multi-pattern 1120. The drone 1100 may first recognize the first multi-pattern 1110 through a landing operation, and may then recognize the second multi-pattern 1120. Accordingly, the first multi-pattern 1110 may be used for a high altitude, and the second multi-pattern 1120 may be used for a low altitude. The drone 1100 may determine its own location based on the recognized multi-patterns 1110 and 1120, so precise control on a targeted landing point may be performed based on the multi-patterns. A precise landing control method according to the variety of a pattern which may be recognized by the drone 1100 for each altitude is described later.

The first multi-pattern 1110 and the second multi-pattern 1120 may be one or more. Each of the multi-patterns 1110 and 1120 has a pattern identifier (ID). The multi-patterns 1110 and 1120 may be identified through respective unique pattern IDs. An unmanned aerial control system may provide the drone 1100 with location information of the multi-patterns 1110 and 1120 that is previously input and managed, so the drone 1100 can determine its own location.

The first multi-pattern 1110 and the second multi-pattern 1120 installed and driven in relation to the station 1130 may provide the drone 1100 with information of the station 1130. The information of the station 1130 may include a station ID, a station direction, a location (e.g., latitude, longitude), a function (e.g., charging, storage), the number of drones 1100 capable of being loaded, and the number of drones 1100 capable of being landed. Furthermore, the multi-patterns 1110 and 1120 are installed using a material having low reflectivity for camera image recognition accuracy.

The multi-patterns 1110 and 1120 may be the first, second, third or more assembly of multi-patterns depending on an installation method.

In the present invention, an area, including the multi-patterns 1110 and 1120 and a landing point and provided so that the drone 1100 can make a landing, is described as a landing area.

FIG. 12 is an example of a drone operation in a precise landing control method to which the present invention may be applied.

The drone 1100 flies to a designated destination, and searches for the multi-patterns 1110 and 1120 (S1210). Global positioning systems (GPSs) may be used for a location determination for flying to the first destination. If the drone 1100 arrives near the destination based on the GPS information, the drone 1100 performs a search flight for searching for the multi-patterns 1110 and 1120. For such search, the camera sensor of the drone 1100 may be used.

The drone 1100 recognizes the multi-patterns 1110 and 1120 during the search flight based on a camera image (S1220). At the altitude where the drone 1100 that has arrived at the destination is first positioned, the second multi-pattern 1120 may not have a size sufficient enough to be recognized by the camera sensor, and thus the first multi-pattern 1110 may be first recognized.

The drone 1100 that has recognized the multi-patterns 1110 and 1120 (S1220) obtains information by analyzing the coded multi-patterns 1110 and 1120 (S1230). If the multi-patterns 1110 and 1120 are related to the station 1130, the drone 1100 first determines whether a corresponding station is a target station 1130 based on a station ID. If the corresponding station is not the target station 1130, the drone 1100 obtains a pattern ID in order to identify its own location. The drone 1100 obtains location information of the patterns based on the pattern ID, and performs a multi-pattern search flight for searching for the target station 1130 again based on the location information.

The drone 1100 performs landing control based on the obtained information (S1240). If the obtained station ID is the ID of the target station 1130, the drone 1100 makes a landing at the corresponding station. Pattern information that may be obtained for each altitude of the drone 1100 may be used for such landing control.

If corresponding multi-patterns are not the multi-patterns 1110 and 1120 related to the station 1130, the drone 1100 may determine a target landing point and perform landing control based on only the pattern ID.

FIG. 13 is an example of pattern information for each altitude to which the present invention may be applied.

FIG. 13(*a*) shows pattern information which may be first recognized by the drone 1100 through a multi-pattern search flight. The first multi-pattern 1110 is for a high altitude, and has a sufficient size that may be recognized at the altitude where the multi-pattern search flight of the drone 1100 is performed. The size of the first multi-pattern 1110 is flexible depending on an operating method of the drone 1100. A large size may be installed as the altitude of a flight for the multi-pattern search of the drone 1100 is higher, and a smaller size may be installed as the altitude of a flight for the multi-pattern search of the drone 1100 is lower. The second multi-pattern 1120 has a small size to the extent that it cannot be recognized by the drone 1100 of the embodiment of FIG. 13(*a*). Accordingly, the drone 1100 obtains information by recognizing only the first multi-pattern 1110. For example, the multi-patterns 1110 and 1120 related to the station 1130 have the same station ID and have unique pattern IDs, respectively. Referring to FIG. 13(*a*), all the first multi-patterns 1110 may have a "P" value, that is, the same station ID, and may have a unique pattern ID that increases by 1 clockwise. Furthermore, the first multi-pattern may provide the drone 1100 with its own location information having a coordinate value based on the landing point of the drone 1100. The drone 1100 may calculate its own location based on an average value of the coordinate values. To this end, the first multi-patterns 1110 need to be symmetrical in pairs. The calculation of the location of the drone 1100 using the second multi-pattern 1120 may be performed using the same method.

FIG. 13(*b*) shows pattern information in the altitude where the drone 1100 can recognize only the second multi-pattern 1120. The drone 1100 may recognize only part of the first multi-pattern 1110 at the corresponding altitude, and cannot obtain information from the first multi-pattern 1110.

In this case, the drone may obtain information for landing control through the second multi-pattern 1120. In particular, the second multi-pattern 1120 is positioned closer to the landing point of the drone 1100 compared to the first multi-pattern 1110, so the drone can obtain more precise location information. The drone 1100 can perform precise landing control compared to a case where only the first multi-pattern 1110 is used.

FIG. 13(*c*) shows pattern information at the altitude where the drone 1100 may recognize both the first multi-pattern 1110 and the second multi-pattern 1120. The drone 1100 moves to the location where only the second multi-pattern 1120 may be recognized based on a form in which the first multi-pattern 1110 and the second multi-pattern 1120 have been combined. Accordingly, in order to use such a combined form, the first multi-pattern 1110 and the second multi-pattern 1120 may be combined in a regular form.

FIG. 14 is an example of a multi-pattern form according to the altitude of a drone to which the present invention may be applied. FIG. 14(*a*) is an example of drone altitudes having different forms of multi-patterns which may be recognized. FIG. 14(*b*) is an example of multi-pattern forms which may be recognized based on such altitudes.

The multi-patterns 1110 and 1120 may be configured with a combination of a plurality of patterns having different sizes. In the present invention, the multi-patterns 1110 and 1120 have been illustrated as including the first multi-pattern 1110 for high altitude recognition and the second multi-pattern 1120 for low altitude recognition, but the present invention is not limited thereto. Accordingly, a pattern combination method according to a difference between sizes may be changed depending on the altitude of a camera driven in the drone 1100, an angle of view, whether recognition according to the number of pixels is possible or/and an operating method of the drone 1100.

The drone 1100 first recognizes the first multi-pattern 1110 at an altitude H 1_1 through a multi-pattern search flight (S1400). If a corresponding point is the landing point of the drone 1100 based on information obtained through the first multi-pattern 1110, the drone 1100 performs precise landing control at an altitude H 1_2 (S1410). Accordingly, the first multi-pattern 1110 needs to have a size sufficient enough to be recognized by the drone 1100 through a multi-pattern search flight in a corresponding area. The second multi-pattern 1120 needs to have a smaller size than the first multi-pattern 1110.

At an altitude H 1_3, the drone recognizes the first multi-pattern 1110 in a full camera size (S1420). If the location of the drone 1100 deviates from the landing point with respect to the x, y axis at the altitude H 1_3, the first multi-pattern 1110 may not be recognized. Accordingly, at the altitude H 1_3, the second multi-pattern 1120 needs to be recognized at the same time. To this end, the second multi-pattern 1120 needs to have a sufficient size and needs to be positioned within the range of the first multi-pattern 1110.

At an altitude H 2_1, only the second multi-pattern 1120 is recognized (S1430). The drone 1100 positioned at the altitude H 1_3 needs to perform precise landing control so that the second multi-pattern 1120 is positioned at the center, while moving to the altitude H 2_1. To this end, the first multi-pattern 1110 and the second multi-pattern 1120 need to be configured in such a way as to surround the landing point with the landing point being at the center. The second multi-pattern 1120 needs to be positioned closer to the landing point.

At an altitude H 1_4, both the first multi-pattern 1110 and the second multi-pattern 1120 are not recognized (S1440). In such a case, the drone 1100 needs to perform a search flight on the second multi-pattern 1120 around the corresponding point. Such a search flight may be performed in such a way as to gradually widen a search range on the basis of the current location of the drone 1100.

At an altitude H 2_2, only the second multi-pattern 1120 is recognized (S1450). In order for precise landing control of the drone 1100 to be performed with continuity, a plurality of the second multi-patterns 1120 needs to be disposed around the landing point because only the second multi-pattern 1120 can be recognized between the altitude H 2_1 and the altitude H 2_2. The plurality of second multi-patterns 1120 may be disposed to surround the landing point. The second multi-patterns 1120 need to be disposed at intervals in which at least one of the second multi-patterns can be recognized until the drone 1100 reaches the altitude where the drone can make a safe landing even without depending on the second multi-pattern 1120.

The drone 1100 may perform precise landing control as the number of first multi-pattern 1110 and second multi-pattern 1120 increases and/or the size of the multi-pattern are smaller. However, the number and/or size of the second multi-patterns 1120 have a greater influence compared to the number and/or size of the first multi-patterns 1110 because higher precision of landing control is necessary as the drone becomes closer to the landing point.

FIG. 15 is an example of a precise landing control method to which the present invention may be applied.

The drone 1100 receives an image through the camera sensor (S1510). The image may be analyzed by the drone 1100 itself and/or may be transmitted to the server 200 to which the drone 1100 is connected and may be analyzed by the server 200. Control of the drone 1100 may be performed based on the analyzed image information.

In an image analysis process, the drone 1100 and/or the server 200 may recognize the multi-pattern 1110, 1120 (S1520). As described above, the first multi-pattern 1110 having a larger size may be first recognized. If the drone 1100 does not recognize the multi-pattern 1110, 1120 within a predetermined space, time, the drone 1100 may make a flight for searching fora different multi-pattern (S1530).

Independently, the drone 1100 may transmit an error message or take other proper measures. The proper measures may include turning on a light if light is insufficient or may include making a low-altitude flight up to an effective visible distance of the camera sensor if it is difficult to secure a field of vision of an image due to fog or rain, for example.

If the multi-pattern 1110, 1120 is successfully recognized, the drone 1100 and/or the server 200 obtain an identifier (ID) by analyzing the multi-pattern 1110, 1120 (S1540). The ID includes a station ID, a pattern ID, as described above.

If the obtained ID is different from a target station ID or pattern ID of the drone 1100, the drone 1100 makes a flight for multi-pattern search again (S1530). If the obtained ID is the same as the target station ID and/or the pattern ID, the drone 1100 obtains information from the recognized multi-pattern 1110, 1120.

The drone 1100 adjusts a location and posture based on the obtained information (S1560). The location information of the drone 1100 may be obtained for each pattern as described above with reference to FIG. 13. The location of the drone 1100 may be adjusted based on an average value of the coordinate values of the location information for each pattern so that a landing point is positioned at the center. In order to adjust the posture of the drone 1100, the multi-pattern 1110, 1120 need to be disposed in pairs symmetrical in the same size. If the sizes of pairs of the multi-patterns 1110 and 1120 recognized by the drone 1100 are different, the drone 1100 may determine that it has a posture inclined toward the direction in which the size is greatly recognized. In this case, the drone may adjust its posture so that the sizes of pairs of the multi-patterns 1110 and 1120 are the same.

The drone 1100 performs precise landing control, while maintaining the adjusted location and posture (S1570). For the landing, the drone 1100 may descend to a given altitude or more and then repeat the process from the first image input step until the landing is completed. The drone 1100 may perform precise landing control by repeatedly performing the steps. Accordingly, a high-efficiency landing system can be constructed at a low cost because the location and posture of the drone can be adjusted based on a camera image.

General Apparatus to which the Present Invention May be Applied

FIG. 16 illustrates a block diagram of a communication device according to an embodiment of the present invention wireless.

Referring to FIG. 16, a wireless communication system includes a base station (or network) 1610 and a terminal 1620.

In this case, the terminal may be a UE, a UAV, a drone, a radio aerial robot, etc.

The base station 1610 includes a processor 1611, a memory 1612, and a communication module 1613.

The processor implements the functions, processes and/or methods proposed in FIGS. 1 to 15. The layers of a wired/wireless interface protocol may be implemented by the processor 1611. The memory 1612 is connected to the processor 1611 and stores various types of information for driving the processor 1611. The communication module 1613 is connected to the processor 1611 and transmits and/or receives wired/wireless signals.

The communication module 1613 may include a radio frequency (RF) unit for transmitting/receiving a radio signal.

The terminal 1620 includes a processor 1621, a memory 1622, and a communication module (or RF unit) 1623. The processor 1621 implements the functions, processes and/or methods proposed in FIGS. 1 to 16. The layers of a radio interface protocol may be implemented by the processor 1621. The memory 1622 is connected to the processor 1621 and stores various pieces of information for driving the processor 1621. The communication module 1623 is connected to the processor 1621 and transmits and/or receives a radio signal.

The memory 1612, 1622 may be positioned inside or outside the processor 1611, 1621 and may be connected to the processor 1611, 1621 by various well-known means.

Furthermore, the base station 1610 and/or the terminal 1620 may have a single antenna or multiple antennas.

FIG. 17 illustrates a block diagram of a communication device according to an embodiment of the present invention.

Particularly, FIG. 17 is a diagram illustrating the terminal of FIG. 16 more specifically.

Referring to FIG. 17, the terminal may include a processor (or digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (this element is optional), a speaker 1745, and a microphone 1750. The terminal may further include a single antenna or multiple antennas.

The processor 1710 implements the function, process and/or method proposed in FIGS. 1 to 16. The layers of a radio interface protocol may be implemented by the processor 1710.

The memory 1730 is connected to the processor 1710, and stores information related to the operation of the processor 1710. The memory 1730 may be positioned inside or outside the processor 1710 and may be connected to the processor 1710 by various well-known means.

A user inputs command information, such as a telephone number, by pressing (or touching) a button of the keypad 1720 or through voice activation using the microphone 1750, for example. The processor 1710 receives such command information and performs processing so that a proper function, such as making a phone call to the telephone number, is performed. Operational data may be extracted from the SIM card 1725 or the memory 1730. Furthermore, the processor 1710 may display command information or driving information on the display 1715 for user recognition or convenience.

The RF module 1735 is connected to the processor 1710 and transmits and/or receives RF signals. The processor 1710 delivers command information to the RF module 1735 so that the RF module 1735 transmits a radio signal that forms voice communication data, for example, in order to initiate communication. The RF module 1735 includes a receiver and a transmitter in order to receive and transmit radio signals. The antenna 1740 functions to transmit and receive radio signals. When a radio signal is received, the RF module 1735 delivers the radio signal so that it is processed by the processor 1710, and may convert the signal into a baseband. The processed signal may be converted into audible or readable information output through the speaker 1745.

The aforementioned embodiments have been achieved by combining the elements and characteristics of the present invention in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

The drone landing method of the present invention has been illustrated as being applied to the 3GPP LTE/LTE-A system, 5G, but may be applied to various wireless communication systems.

According to an embodiment of the present invention, there is an effect in that a precise landing can be made using a multi-pattern in an unmanned aerial control system.

Furthermore, according to an embodiment of the present invention, there is an effect in that a precise landing can be made using only a cheap camera sensor.

Effects of the present invention are not limited to the above-described effects, and other technical effects not described above may be evidently understood by those skilled in the art to which the present invention pertains from the following description.

The invention claimed is:

1. A precise landing method using a multi-pattern of an unmanned aerial robot in an unmanned aerial control system, the method comprising:

receiving an image value from an outside and recognizing a multi-pattern in which control information for precise landing control has been coded based on the image value;

obtaining control information when an identifier (ID) value included in the control information indicates a landing point;

moving to the landing point based on the control information; and performing landing at the landing point, and recognizing the multi-pattern again if the landing is not completed, wherein a landing area for the landing of the unmanned aerial robot includes the landing point and the multi-pattern, wherein the multi-pattern includes a first multi-pattern and a second multi-pattern having a smaller size than the first multi-pattern, wherein the first multi-pattern is respectively located in a first to fourth quadrants on a coordinate plane, wherein the first multi-pattern and the second multi-pattern have pairs having an identical size and are symmetrical with respect to the landing point, and wherein the method further comprises:

adjusting an inclination of the unmanned aerial robot to a surface of the landing area in parallel based on a size difference of at least one the pairs as viewed by the unmanned aerial robot.

2. The method of claim 1, further comprising:
performing a movement flight for searching for a different multi-pattern and recognizing the multi-pattern again, if the multi-pattern recognition fails.

3. The method of claim 2, further comprising:
performing a movement flight for searching for a different multi-pattern and recognizing the multi-pattern again, if the ID value does not indicate the landing point.

4. The method of claim 3, further comprising:
searching for the second multi-pattern if both the first multi-pattern and the second multi-pattern are not recognized after recognition of the first multi-pattern is first successful.

5. The method of claim 4,
wherein the first multi-pattern and the second multi-pattern are disposed peripherally with respect to the landing point, and
wherein the second multi-pattern is positioned closer to the landing point compared to the first multi-pattern.

6. The method of claim 5,
wherein the second multi-pattern has a size recognized simultaneously with the first multi-pattern at a specific altitude and is surrounded by the first multi-pattern.

7. The method of claim 6,
wherein the first multi-pattern and the second multi-pattern are disposed in a regular form, and
wherein current location information of the unmanned aerial robot is obtained based on the regular form.

8. The method of claim 7,
wherein the multi-pattern is positioned within or on top of a station, and
wherein the control information includes information of an ID, direction, location, function, number of unmanned aerial robots capable of being loaded, and number of unmanned aerial robots capable of being landed on the station.

9. The method of claim 7,
wherein the control information includes location information of each of the first and second multi-patterns of the multi-pattern,
wherein the location information of each of the first and second multi-patterns of the multi-pattern includes a coordinate value having the landing point as a reference point, and
wherein the current location information of the unmanned aerial robot is obtained based on an average value of the coordinate values.

10. The method of claim 1, further comprising:
performing a low-altitude flight for the multi-pattern recognition if the multi-pattern recognition fails within a predetermined space or time range.

11. The method of claim 10,
wherein the landing area is configured using a material having low reflectivity for recognition accuracy.

12. An unmanned aerial robot performing precise landing using a multi-pattern in an unmanned aerial control system, the unmanned aerial robot comprising:

a camera sensor receiving an image value;

a transmitter for transmitting a radio signal;

a receiver for receiving an uplink (UL) grant and a downlink (DL) grant; and a processor, wherein the processor is configured to:

receive an image value from an outside through the camera sensor and recognize a multi-pattern in which control information for precise landing control has been coded based on the image value;

obtain control information when an identifier (ID) value included in the control information indicates a landing point;

move to the landing point based on the control information; and perform landing at the landing point, and recognize the multi-pattern again if the landing is not completed, wherein a landing area for the landing of the unmanned aerial robot includes the landing point and the multi-pattern, wherein the multi-pattern includes a first multi-pattern and a second multi-pattern having a smaller size than the first multi-pattern, wherein the first multi-pattern is respectively located in a first to fourth quadrants on a coordinate plane, wherein the first multi-pattern and the second multi-pattern have pairs having an identical size and are symmetrical with respect to the landing point, and wherein the processor is further configured to:

adjust an inclination of the unmanned aerial robot to a surface of the landing area in parallel based on a size difference of at least one the pairs as viewed by the unmanned aerial robot.

13. The unmanned aerial robot of claim 12, wherein the processor is configured to perform a movement flight for searching for a different multi-pattern and recognize the multi-pattern again, if the multi-pattern recognition fails.

14. The unmanned aerial robot of claim 13, wherein the processor is configured to perform a movement flight for searching for a different multi-pattern and recognize the multi-pattern again, if the ID value does not indicate the landing point.

15. The unmanned aerial robot of claim 14, wherein the processor is configured to search for the second multi-pattern if both the first multi-pattern and the second multi-pattern are not recognized after recognition of the first multi-pattern is first successful.

16. The unmanned aerial robot of claim 12, wherein the processor is configured to perform a low-altitude flight for the multi-pattern recognition if the multi-pattern recognition fails within a predetermined space or time range.

* * * * *